US008261083B2

(12) United States Patent
Nakamura et al.

(10) Patent No.: US 8,261,083 B2
(45) Date of Patent: Sep. 4, 2012

(54) NAVIGATION APPARATUS AND INFORMATION DISTRIBUTION SYSTEM

(75) Inventors: Norihiro Nakamura, Toyokawa (JP); Isao Moribe, Okazaki (JP); Hiroyoshi Masuda, Nagoya (JP); Toru Sakai, Okazaki (JP); Yoriyuki Nagata, Okazaki (JP); Hironobu Sugimoto, Toyota (JP); Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 623 days.

(21) Appl. No.: 12/312,746

(22) PCT Filed: Jan. 15, 2008

(86) PCT No.: PCT/JP2008/050667
§ 371 (c)(1),
(2), (4) Date: May 26, 2009

(87) PCT Pub. No.: WO2008/088063
PCT Pub. Date: Jul. 24, 2008

(65) Prior Publication Data
US 2010/0070772 A1    Mar. 18, 2010

(30) Foreign Application Priority Data
Jan. 17, 2007    (JP) .................................. 2007-008450

(51) Int. Cl.
*H04L 29/06*    (2006.01)
(52) U.S. Cl. .......... 713/176; 380/30; 380/277; 380/278; 340/990; 455/414.2

(58) Field of Classification Search .................... 713/176
See application file for complete search history.

(56) References Cited

U.S. PATENT DOCUMENTS

| 5,293,576 | A | * | 3/1994 | Mihm et al. .................. 713/170 |
| 2002/0087263 | A1 | | 7/2002 | Wiener |
| 2004/0117110 | A1 | * | 6/2004 | Sasajima ....................... 701/208 |
| 2004/0147251 | A1 | * | 7/2004 | Nakayama et al. ......... 455/414.2 |

FOREIGN PATENT DOCUMENTS
CN    1503180 A    6/2004
(Continued)

OTHER PUBLICATIONS

Jingfeng Yang et al. "The Random Parameters Insertion Encryption Methods of LBS Application Based on RSA Algorithms." IEEE (2011).*
(Continued)

*Primary Examiner* — Taghi Arani
*Assistant Examiner* — Narciso Victoria
(74) *Attorney, Agent, or Firm* — Oliff & Berridge, PLC

(57) ABSTRACT

A CPU of a navigation apparatus stores public keys to which priorities are set and which are published by an information distribution center in a public key storage section. The CPU of the navigation apparatus extracts an electronic signature of distribution data which is distributed from the information distribution center and verifies the electronic signature by using only 'valid' public keys among the public keys in order of the priorities. The CPU of the navigation apparatus determines that the distribution data is valid information which is distributed from the information distribution center when the electronic signature passes verification.

8 Claims, 9 Drawing Sheets

FOREIGN PATENT DOCUMENTS

| | | |
|---|---|---|
| EP | 1 189 409 A2 | 3/2002 |
| JP | A-2002-244558 | 8/2002 |
| JP | A-2004-172865 | 6/2004 |
| JP | A-2005-331579 | 12/2005 |
| JP | A-2006-133541 | 5/2006 |
| JP | A-2006-285974 | 10/2006 |
| WO | WO 96/11446 | 4/1996 |
| WO | WO 2006/095726 | 9/2006 |

OTHER PUBLICATIONS

Japanese Patent Office, Notification of Reason forRefusal mailed Aug. 17, 2010 in Japanese Patent Application No. 2007-008450 w/English-language Translation.

Chinese Patent Office, First Notification of Reason(s) for Refusal issued May 5, 2011 in Chinese Patent Application No. 200880001168.7 w/Partial English-language Translation.

* cited by examiner

NAVIGATION APPARATUS AND INFORMATION DISTRIBUTION SYSTEM

TECHNICAL FIELD

The present invention relates to a navigation apparatus for receiving map update information and an information distribution system for distributing map update information to the navigation apparatus.

BACKGROUND ART

In recent years, various sorts of information distribution systems for distributing update information for updating map data from an information distribution center to a navigation apparatus through a storage medium such as a DVD-ROM or a HDD, or a network such as a mobile phone network have been suggested.

For example, one of the suggested information distribution systems (for example, Japanese Unexamined Patent Application Publication No. 2005-331579 (paragraphs 0011 through 0028, FIGS. 1 through 4) attaches a unique ID indicating a navigation apparatus as attribute data to a storage medium on which update map data distributed from an information distribution center is stored. When the navigation apparatus uses the storage medium, the navigation apparatus determines whether its own ID coincides with the ID stored in the storage medium by determining means. When its own ID does not coincide with the stored ID, the navigation apparatus can not use update map data stored in the storage medium.

DISCLOSURE OF INVENTION

However, in the case of the information distribution system disclosed in Japanese Unexamined Patent Application Publication No. 2005-331579, when the unique ID assigned to the navigation apparatus is deciphered by a third party, there is a risk of falsification of map update information stored in the storage medium and it is extremely difficult to ensure the security of map update information.

Meanwhile, there is another way to ensure the security of distributed map data. For example, the information distribution center distributes update map data assigned an electronic signature by using a secret key. The navigation apparatus verifies the electronic signature assigned to update map data by using a public key and determines the validity of distributed map data.

However, in case of an information distribution system which needs a reliable certificate authority provided by a third party to issue a public key to each of navigation apparatuses, when another third party deciphers a secret key, each of the navigation apparatus needs to receive new public keys from the certificate authority. In this case, the procedure might be complicated and a cost of the procedure might be increased. Further, another problem is that the information distribution center can not distribute update map data with an electronic signature by using a new secret key until each of the navigation apparatuses receives the new public keys from the certificate authority.

To solve the problems described above, the present invention provides an information distribution system for ensuring the security of map update information distributed to a navigation apparatus and the navigation apparatus for containing such an information distribution system therein.

To achieve the purpose described above, there is provided the navigation apparatus of Claim 1, comprising: a public key storage device that stores a plurality of public keys, to which priorities are assigned, for verifying map information which is distributed from an information distribution center; an electronic signature extracting device that extracts an electronic signature set for the map information which is distributed from the information distribution center; a verification control device that verifies the electronic signature by using the plurality of public keys for which the priorities are set in order of the priorities; and a determining device that determines that the map information is valid information which has been distributed from the information distribution center, provided that the electronic signature passes verification.

According to the navigation apparatus of Claim 2, the navigation apparatus of Claim 1, wherein: the verification control device performs control to, provided that there is a public key which does not pass the verification before the electronic signature passes the verification, set the public key which does not pass the verification as invalid.

According to the navigation apparatus in Claim 3, the navigation apparatus of Claim 2, wherein: the verification control device includes a temporarily invalid setting device that sets the public key which does not pass the verification as a temporarily invalid key; and the verification control device invalidates the public key which is set as the temporarily invalid key by the temporarily invalid setting device when the electronic signature passes verification and the verification control device further moves the priorities of the rest of public keys forward and controls to store the public keys back in the public key storage device.

According to the navigation apparatus in Claim 4, the navigation apparatus of Claim 3, wherein: the verification control device performs control to unset the setting of the public key as one temporarily invalid key by the temporarily invalid setting device when the electronic signature does not pass verification; and the determining device determines that the map information is invalid information.

According to the navigation apparatus in Claim 5, the navigation apparatus of any one of Claim 1 through Claim 4, further comprising: a decode data generating device that generates decode data of the electronic signature by using the public keys stored in the public key storage device; and a navigation hash value generating device that generates a hash value of the map information; wherein: the verification control device allows the electronic signature to pass verification when the decode data coincides with the hash value and does not allow the electronic signature to pass verification when the decode data does not coincide with the hash value.

An information distribution system of Claim 6, comprising: an information distribution center for distributing map information; and a navigation apparatus, wherein: the information distribution center, further comprises: a key generating device that generates a plurality of sets of one public key and one secret key and setting priorities for the plurality of sets of one public key and one secret key; a secret key storage device that stores the plurality of secret keys with the priorities; an electronic signature generating device that generates an electronic signature by using one secret key whose priority is stored as being top in the secret key storage device; and a distributing device that distributes the map information with the electronic signature, wherein: the information distribution center issues the plurality of the public keys with the priorities to the navigation apparatus; and the navigation apparatus, further comprises: a public key storage device that stores the plurality of public keys with the priorities issued by the information distribution center; an electronic signature extracting device that extracts the electronic signature set for the map information which is distributed from the information distribution center; a verification control device that performs control to verify the electronic signature by using the plurality of the public keys with the priorities in order of the priorities; and a determining device that determines that the map information is valid information distributed from the information distribution center, provided that the electronic signature passes verification.

According to the information distribution system in Claim 7, the information distribution system of Claim 6, wherein: the verification control device performs control to, provided that there is a public key which does not pass the verification before the electronic signature passes the verification, set the public key which does not pass the verification as invalid.

According to the information distribution system in Claim 8, the information distribution system of Claim 7, wherein: the verification control device, comprises: a temporarily invalid setting device that sets the public key which does not pass the verification as the temporarily invalid key, wherein: the verification control device invalidates, provided that the electronic signature passes the verification, the public key which is set as the temporarily invalid key by the temporarily invalid setting device and moves the priorities of the rest of the public keys forward and performs control to store the public keys back in the public key storage device.

According to the information distribution system in Claim 9, the information distribution system of Claim 8, wherein: the verification control device performs control to unset the setting of the public key as one temporarily invalid key by the temporarily invalid setting device, provided that the electronic signature does not pass the verification; and the determining device determines that the map information is invalid information.

According to the information distribution system in Claim 10, the information distribution system of any one of Claim 6 through Claim 9, wherein: the electronic signature generating device includes a center hash value generating device that generates a hash value of the map information, wherein: the electronic signature generating device generates the electronic signature by using both of the hash value and the secret key whose priority is stored as being top in the secret key storage device; and the verification control device, comprising: a decode data generating device that generates decode data which is made by decoding the electronic signature by using the public key stored in the public key storage device; and a navigation hash value generating device that generates the hash value of the map information, wherein: the verification control device allows the electronic signature to pass the verification when the decode data coincides with the hash value and does not allow the electronic signature to pass the verification when the decode data does not coincide with the hash value.

A navigation method of Claim 11, comprising: a step of storing a plurality of public keys with priorities for verifying map information which is distributed from an information distribution center; a step of extracting an electronic signature which is set for the map information distributed from the information distribution center; a step of performing control to verify the electronic signature extracted in the step of extracting the electronic signature by using the plurality of the public keys stored in the step of storing the public keys in order of the priorities; and a step of determining that the map information is valid information which is distributed from the information distribution center, provided that the electronic signature passes verification in the step of controlling the verification.

An information distribution method for distributing map information from an information distribution center to a navigation apparatus of Claim 12, comprising: a step performed by the information distribution center of generating a plurality of sets of one public key and one secret key and setting priorities for the plurality of sets of one public key and one secret key; a step performed by the information distribution center of storing the plurality of secret keys for which the priorities are set in the step of generating keys; a step performed by the information distribution center of issuing the plurality of public keys for which the priorities are set in the step of generating keys to the navigation apparatus; a step performed by the navigation apparatus of storing the plurality of public keys for which the priorities are set and which are issued by the information distribution center in the step of issuing the plurality of keys; a step performed by the information distribution center of generating an electronic signature by using the secret key whose priority is top stored in the step of storing the plurality of secret keys; a step performed by the information distribution center of distributing the electronic signature generated in the step of generating the electronic signature with the map information to the navigation apparatus; a step performed by the navigation apparatus of extracting the electronic signature with the map information which is distributed from the information distribution center in the step of distributing the electronic signature; a step performed by the navigation apparatus of performing control to verify the electronic signature which is extracted in the step of extracting the electronic signature by using the plurality of public keys stored in the step of storing public keys in order of the priorities; and a step performed by the navigation apparatus of determining that the map information is valid information which is distributed from the information distribution center, provided that the electronic signature passes verification in the step of performing control to verify the electronic signature.

The navigation apparatus with the structure described above according to Claim 1 stores the plurality of public keys with priorities to verify map information distributed from the information distribution center. The navigation apparatus extracts an electronic signature assigned to map information which is distributed from the information distribution center and verifies the electronic signature by using the plurality of public keys in order of the priorities. When the electronic signature passes verification, the navigation apparatus determines that the map information is valid information distributed from the information distribution center.

The navigation apparatus verifies the electronic signature assigned to map information which is distributed from the information distribution center by using the public key whose priority is top. Even if the electronic signature does not pass verification, the navigation apparatus does not need a reliable certificate authority provided by a third party to publish a new public key and may continue to verify the electronic signature by using a public key whose priority is the following position, so that it may be possible to quickly verify the electronic signature and to reduce the cost of the verification. Further, when the electronic signature passes verification by using the plurality of public keys which are stored with the priorities, the navigation apparatus determines that the map information is valid information distributed from the information distribution center, so that it may be possible to ensure the security of map information which is distributed to the navigation apparatus.

The navigation apparatus according to Claim 2 verifies the electronic signature by using the plurality of public keys in order of the priorities. When there is any public key which does not pass verification before the electronic signature passes verification, the navigation apparatus invalidates the public key which does not pass verification.

When a secret key is deciphered by a third party, the information distribution center invalidates the deciphered secret key and generates the electronic signature by using a new secret key. In response to this, the navigation apparatus may invalidate the public key corresponding to the deciphered secret key without receiving any data of the public key corresponding to the deciphered secret key from the information distribution center.

The navigation apparatus according to Claim 3 verifies the electronic signature assigned to map information by using the plurality of public keys in order of the priorities. When there is any public key which does not pass verification before the electronic signature passes verification, the navigation apparatus sets the public key which does not pass verification as a temporarily invalid key. When the electronic signature passes verification, the navigation apparatus invalidates the temporarily invalid public key, moves the priorities of the rest of the public keys forward, and stores the public keys again.

When the currently using secret key is deciphered by a third party, the information distribution center invalidates the deciphered secret key and generates the electronic signature by using the secret key whose priority is the following position. In this case, the navigation apparatus may surely invalidate the public key corresponding to the deciphered secret key without receiving any data of the public key corresponding to the deciphered secret key from the information distribution center. When the public key corresponding to the deciphered secret key is invalidated, the navigation apparatus may move the priorities of the rest of the public keys forward and smoothly verify the electronic signature assigned to map information by using the valid public keys in order of the priorities without receiving any data of the new public key from the reliable certificate authority provided by a third party.

The navigation apparatus according to Claim 4 verifies the electronic signature assigned to map information by using the plurality of the public keys in order of the priorities. When the electronic signature does not pass verification, the navigation apparatus unsets the temporarily invalid public key and determines that the map information is invalid information.

Therefore, when a malicious third party assigns the electronic signature to map information by using a different secret key from any of the secret keys which are owned by the information distribution center, the navigation apparatus unsets the temporarily invalid keys even though all of valid public keys do not pass verification, so that the validity of all of the public keys may be maintained and the security of data may be ensured because the navigation apparatus may determine that the map information is invalid information.

The navigation apparatus according to Claim 5 generates decode data of the electronic signature by using the plurality of valid public keys in order of the priorities. The navigation apparatus further generates a hash value of map information. When the hash value coincides with decode data, the navigation apparatus allows the electronic signature to pass verification. When the hash value does not coincide with decode data, the navigation apparatus does not allow the electronic signature to pass verification.

Thereby, even when a malicious third party assigns the electronic signature to map information by using a different secret key from the secret key which is owned by the information distribution center or even when the malicious third party tampers map information without changing the electronic signature, the navigation apparatus does not allow the electronic signature to pass verification, provided that the hash value generated from map information does not coincide with decode data, so that the falsification of the map information may be detected and the security of map information may be ensured.

According to the information distribution system of Claim 6, the information distribution center generates the plurality of sets of one public key and one secret key and assigns priorities to the public keys and the secret keys. The information distribution center stores the plurality of secret keys with the priorities. The information distribution center issues the plurality of public keys with the priorities of the navigation apparatus. Further, the information distribution center generates the electronic signature by using the secret key whose priority is top and distributes the map information with the electronic signature.

The navigation apparatus stores the plurality of public keys with the priorities which are issued by the information distribution center. The navigation apparatus extracts the electronic signature assigned to map information which is distributed from the information distribution center and verifies the electronic signature by using the plurality of public keys in order of the priorities. When the electronic signature passes verification, the navigation apparatus determines that the map information is valid information which is distributed from the information distribution center.

Therefore, the information distribution center generates the electronic signature by using the secret key whose priority is top among the plurality of secret keys which are assigned priorities and distributes the electronic signature with map information, so that the security of map information to be distributed may be ensured. Further, when a third party deciphers the secret key whose priority is top, it may be possible to quickly switch the deciphered secret key to one of the rest of secret keys because the plurality of secret keys is stored in advance.

The navigation apparatus verifies the electronic signature assigned to map information which is distributed from the information distribution center by using the public key whose priority is top. Even when the electronic signature does not pass verification, the navigation apparatus may verify the electronic signature by using the public key whose priority is the following position without receiving any data of the new public key from a reliable certificate authority provided by a third party, so that it may be possible to quickly verify the electronic signature and the cost of the verification may be reduced. Further, when the electronic signature passes verification by using the plurality of public keys which are issued from the information distribution center, the navigation apparatus determines that the map information is valid information which is distributed from the information distribution center, so that the security of map information distributed to the navigation apparatus may be ensured.

According to the information distribution system of Claim 7, the navigation apparatus verifies the electronic signature by using the plurality of public keys in order of the priorities. When there is any public key which does not pass verification before the electronic signature passes verification, the public key which does not pass verification is set as invalid.

Therefore, when a third party deciphers the secret key, the information distribution center invalidates the deciphered secret key and generates the electronic signature by using a new secret key. The navigation apparatus may invalidate the public key corresponding to the deciphered secret key without receiving any data of the public key corresponding to the deciphered secret key from the information distribution center.

According to the information distribution system of Claim 8, the navigation apparatus verifies the electronic signature assigned to map information by using the plurality of public keys in order of the priorities. When there is any public key which does not pass verification before the electronic signature passes verification, the public key which does not pass verification is set as the temporarily invalid public key. When the electronic signature passes verification, the navigation apparatus invalidates the temporarily invalid public key, moves the priorities of the rest of the public keys, and stores the public keys again.

Therefore, when the secret key is deciphered by a third party, the information distribution center invalidates the deciphered secret key and generates the electronic signature by using the new secret key. The navigation apparatus may invalidate the public key corresponding to the deciphered secret key without receiving any data of the public key corresponding to the deciphered secret key from the information distribution center. Further, when the public key corresponding to the deciphered secret key is invalidated, the navigation apparatus may move the priorities of the rest of the public keys and smoothly verify the electronic signature assigned to map information by using the valid public keys in order of the priorities without receiving any data of the new public key from a reliable certificate authority provided by a third party.

According to the information distribution center of Claim 9, the navigation apparatus verifies the electronic signature assigned to map information by using the plurality of public keys in order of the priorities. When the electronic signature does not pass verification, the navigation apparatus unsets the temporarily invalid public keys and determines that the map information is invalid information.

Therefore, when a malicious third party assigns the electronic signature to map information by using the different secret key from the secret key which is owned by the information distribution center, the navigation apparatus unsets the temporarily invalid public keys even though all of valid public keys do not pass verification, so that the validity of all of the public keys may be maintained and the security of information may be ensured because it is determined by the navigation apparatus that the map information is invalid information.

The information distribution system of Claim 10, the information distribution center generates the hash value of map information to be distributed and generates the electronic signature by using both of the hash value and the secret key whose priority is top. The navigation apparatus generates decode data of the electronic signature by using only valid public keys among the plurality of public keys in order of the priorities. When the hash value coincides with decode data, the electronic signature is been passed verification. When the hash value does not coincide with decode data, the navigation apparatus does not allow the electronic signature to pass verification.

Therefore, the information distribution center generates the electronic signature by using both of the hash value calculated from map information to be distributed and the secret key whose priority is top, so that it may be quickly generate the electronic signature. Even when a malicious third party assigns the electronic signature to map information by using the different secret key from the secret key which is owned by the information distribution center or even when the malicious third party tampers map information without changing the electronic signature, the navigation apparatus does not allow the electronic signature to pass verification when the hash value calculated from map information does not coincide with decode data. Thereby, the falsification of the map information may be detected and the security of map information may be ensured.

In the navigation method according to Claim 11, the navigation apparatus stores the pluralities of public keys with priorities for verifying map information which is distributed from the information distribution center. The navigation apparatus extracts the electronic signature assigned to map information which is distributed from the information distribution center and verifies the electronic signature by using the plurality of public keys in order of the priorities. When the electronic signature passes verification, the navigation apparatus determines that the map information is valid information which is distributed from the information distribution center.

Therefore, the navigation apparatus verifies the electronic signature assigned to map information which is distributed from the information distribution center by using the public key whose priority is top. Even when the electronic signature does not pass verification, the navigation apparatus may verify the electronic signature by using the public key whose priority is the following position without receiving any data of the new public key from a reliable certificate authority provided by a third party, so that it may be possible to quickly verify the electronic signature and the cost of the verification may be reduced. When the electronic signature passes verification by using the plurality of public keys with the priorities, the navigation apparatus determines that the map information is valid information which is distributed from the information distribution center, so that the security of map information to be distributed to the navigation apparatus may be ensured.

According to the information distribution method of Claim 12, the information distribution center generates the plurality of sets of one public key and one secret key and assigns priorities to the plurality of the sets of one public key and one secret key. Then the information distribution center stores the plurality of the secret keys with the priorities. The information distribution center issues the plurality of public keys with the priorities to the navigation apparatus. The information distribution center generates the electronic signature by using the secret key whose priority is top and distributes the electronic signature assigned to map information.

The navigation apparatus stores the plurality of public keys with the priorities which are issued by the information distribution center. The navigation apparatus extracts the electronic signature assigned to map information which is distributed from the information distribution center and verifies the electronic signature by using the plurality of public keys in order of the priorities. When the electronic signature passes verification, the navigation apparatus determines that the map information is valid information which is distributed from the information distribution center.

Therefore, the information distribution center generates the electronic signature by using the secret key whose priority is top among the plurality of secret keys with the priorities and distributes the electronic signature assigned to map information, so that the security of map information to be distributed may be ensured. When a third party deciphers the secret key whose priority is top, the information distribution center may quickly switch the deciphered secret key to one of the rest of secret keys because the plurality of secret keys is stored in advance.

The navigation apparatus verifies the electronic signature assigned to map information which is distributed from the information distribution center by using the public key whose priority is top. Even when the electronic signature does not pass verification, the navigation apparatus may verify the electronic signature by using the public key whose priority is the following position without receiving any data of the new public key from a reliable certificate authority provided by a third party, so that it may be possible to quickly verify the electronic signature and the cost of the verification may be reduced. When the electronic signature passes verification by using the plurality of public keys which are published by the information distribution center, the navigation apparatus determines that the map information is valid information which is distributed from the information distribution center, so that the security of map information to be distributed to the navigation apparatus may be ensured.

BEST MODE FOR CARRYING OUT THE INVENTION

Hereinafter, an exemplary specific embodiment according to the navigation apparatus and the information distribution system of the present invention will be explained with reference to the attached drawings.

Figure 1:
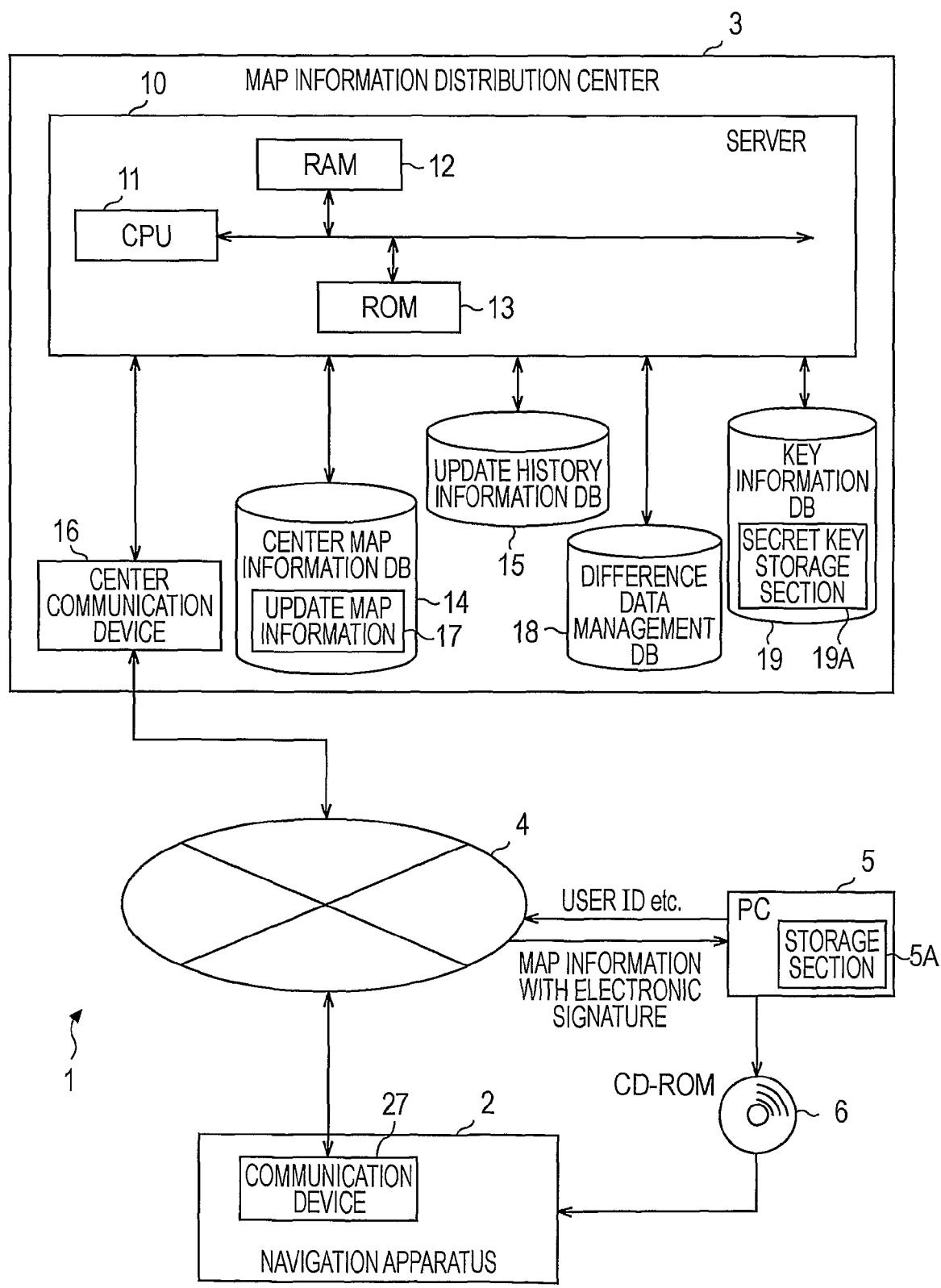
FIG. 1 is a block diagram of a map information distribution system according to the current embodiment.
Figure 2:
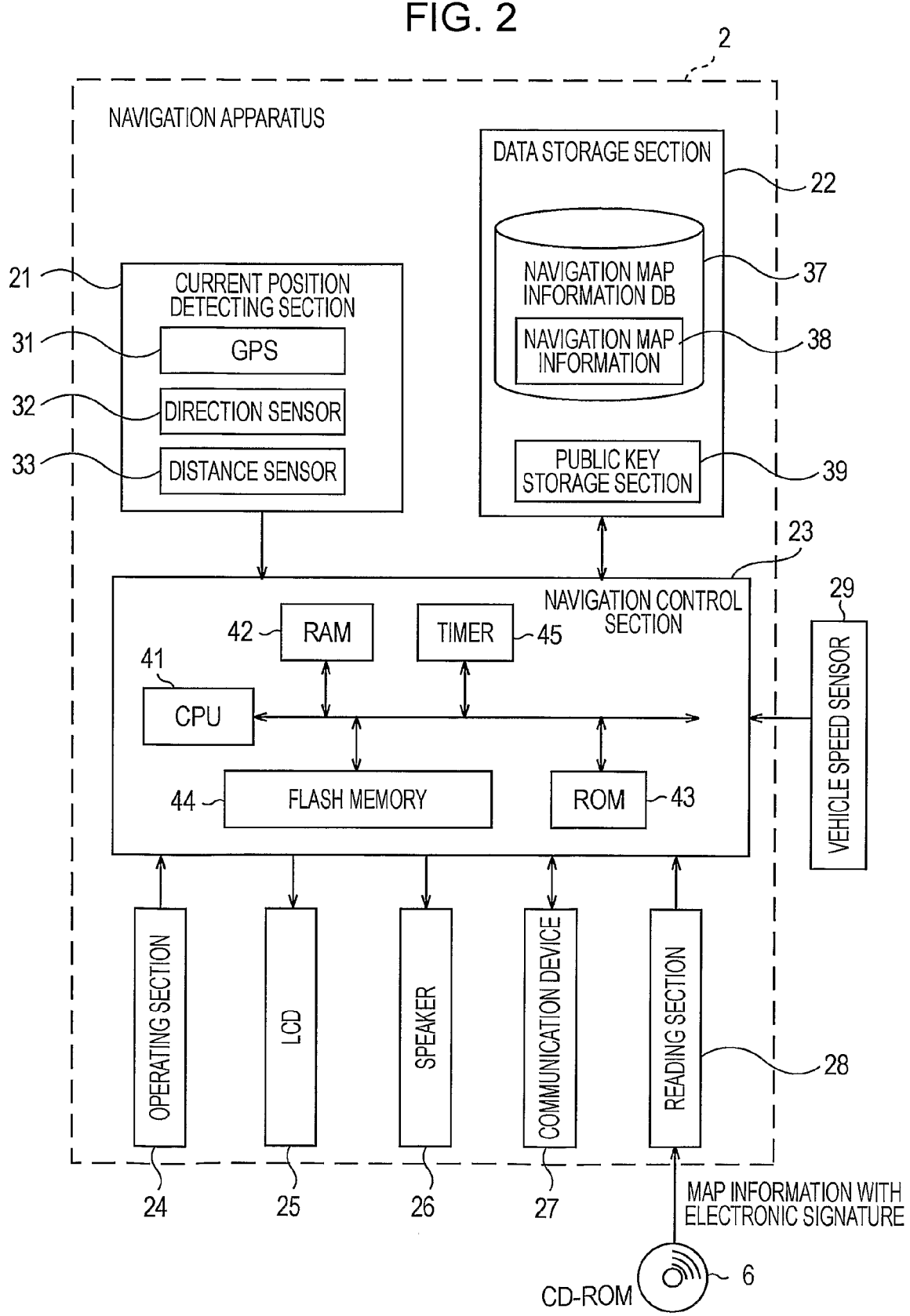
FIG. 2 is a block diagram of a navigation apparatus in the map information distribution system.

First, an outline of the structure of the map information distribution system according to the present embodiment will be described with reference to FIG. 1 and FIG. 2. FIG. 1 is a block diagram of a map information distribution system 1 according to the current embodiment. FIG. 2 is a block diagram of a navigation apparatus 2 in the map information distribution system 1.

As shown in FIG. 1, the map information distribution system 1 according to the present embodiment basically includes the navigation apparatus 2, a map information distribution center 3 as an information distribution center for distributing update information such as map update information to the navigation apparatus 2, a network 4, and a PC (Personal Computer) 5 which is able to be connected to the network 4 and which is owned by a user of the navigation apparatus 2 or a dealer. Various types of information are transferred between the navigation apparatus 2 and the map information distribution center 3 through the network 4. Similarly, various types of information are transferred between the PC 5 and the map information distribution center 3 through the network 4. Note that, the structure of the navigation apparatus 2 will be described in detail with reference to FIG. 2 later.

As shown in FIG. 1, the map information distribution center 3 includes a server 10, a center map information database (center map information DB) 14 as a map information storage section connected to the server 10, an update history information database (update history information DB) 15, a center communication device 16, a difference data management database (difference data management DB) 18, and a key information database (key information DB) 19.

The server 10 further includes a CPU 11 as a calculating device and a control device for controlling the entire server 10, a RAM 12 as a working memory used when the CPU 11 executes various types of calculating processing, and an internal storage device such as a ROM 13 on which various types of control programs are stored. As examples of the various types of control programs stored in the ROM 13, for example, programs for executing map information distribution processing for extracting update information which is for updating map information about a distribution target area among map information stored in the navigation apparatus 2 from the center map information DB 14 and for distributing the update information together with the electronic signature to the navigation apparatus 2 or the PC 5 on the basis of the request from the navigation apparatus 2 or the PC 5 as described later or secret key update processing for updating the secret key used for the generation of the electronic signature (FIG. 4) may be included. Note that, for example, an MPU may be used instead of the CPU 11.

The center map information DB 14 stores map update information 17, which is generated in the map information distribution center 3 and is basic map information for updating map information stored in the navigation apparatus 2. The map update information 17 is sorted in terms of versions. Further, the center map information DB 14 stores update information for updating a part of or the entity of map information which is stored in the navigation apparatus 2 (for example, a 80-square-kilometer range with a current vehicle position or on a pre-registered home position at its center) to the latest information which is stored in the map update information 17 (hereinafter referred to as "difference data"). The update information is sorted in terms of versions as well.

Version here denotes a time when map information was generated. Therefore, it may be possible to specify when map information was generated by referring to the version of information.

As map update information 17 stored in the center map information DB 14, various kinds of information necessary for route guidance and map display for the navigation apparatus 2 are stored. For example, map display data for displaying a map, intersection data representing intersections, node data representing node points, link data representing roads (links) as one type of facilities, search data for searching for a route, shop data representing POIs (Point of Interest) as one type of facility, and point search data for searching for a point may be included.

According to the map display data, a mesh which divides the land into 10-square-kilometer areas is used as a standard unit. Further, the standard unit may be subdivided into 4 subunits (½ length), 16 subunits (¼ length), or 64 subunits (⅛ length) and those subunits may be used as each data amount of each area is evened out. The area of the smallest subunit, for example, the case when the standard unit is divided into 64 subunits, may be approximately 1.25-square-kilometers.

Roads are categorized into three types and are stored and managed in the map update information 17 by versions. First type is a high-standard highway type which includes a national expressway, an urban expressway, a motor highway, an ordinary toll road, and a national road whose road identification number is a 1 or 2-digit number. The second type is an ordinary road type which includes a national road whose road identification number is a number with more than 3-digits, a principal prefectural road, a prefectural road, and a municipal road. The third type is a narrow street.

In the difference data management DB 18, file names of difference data indicating difference data are stored and managed by versions and by road types. More specifically, difference data is sorted in terms of versions of the map update information 17 first, and the data is further sorted in terms of approximately 2.5-square-kilometer areas for which each of range ID is set, and the area data is finally sorted in terms of the three road types described above.

In the update history information DB 15, update history information representing update history of all map information ever stored in the navigation apparatus 2 is stored, the navigation apparatus 2 being, assigned a navigation ID for specifying the navigation apparatus 2. Further, update history information representing map update information distributed to a user of the PC 5 is stored, the user being assigned with a user ID for specifying the user.

Then the map information distribution center 3 extracts difference data for updating map update information which was distributed last time to the navigation apparatus 2 or the PC 5 to the latest version of map update information 17 among all of map update information 17 stored in the center map information DB 14 when the navigation apparatus 2 or the PC 5 requests it. Then the map information distribution center 3 distributes the data assigned with the electronic signature to the navigation apparatus 2 or the PC 5 as described later.

The PC 5 which is owned by the user of the navigation apparatus 2 or by the dealer includes a storage section 5A for storing the received map update information on a CD-ROM 6 as a storage medium, so that the navigation apparatus 2 may read the data by using a reading section 28 (FIG. 2). Note that, a magnetic disk such as a flexible disk, a memory card, a magnetic tape, a magnetic drum, an MD, a DVD, an ID card, or an optical card may be used instead of the CD-ROM 6 as long as the reading section 28 of the navigation apparatus 2 may read such a storage medium.

Figure 3:
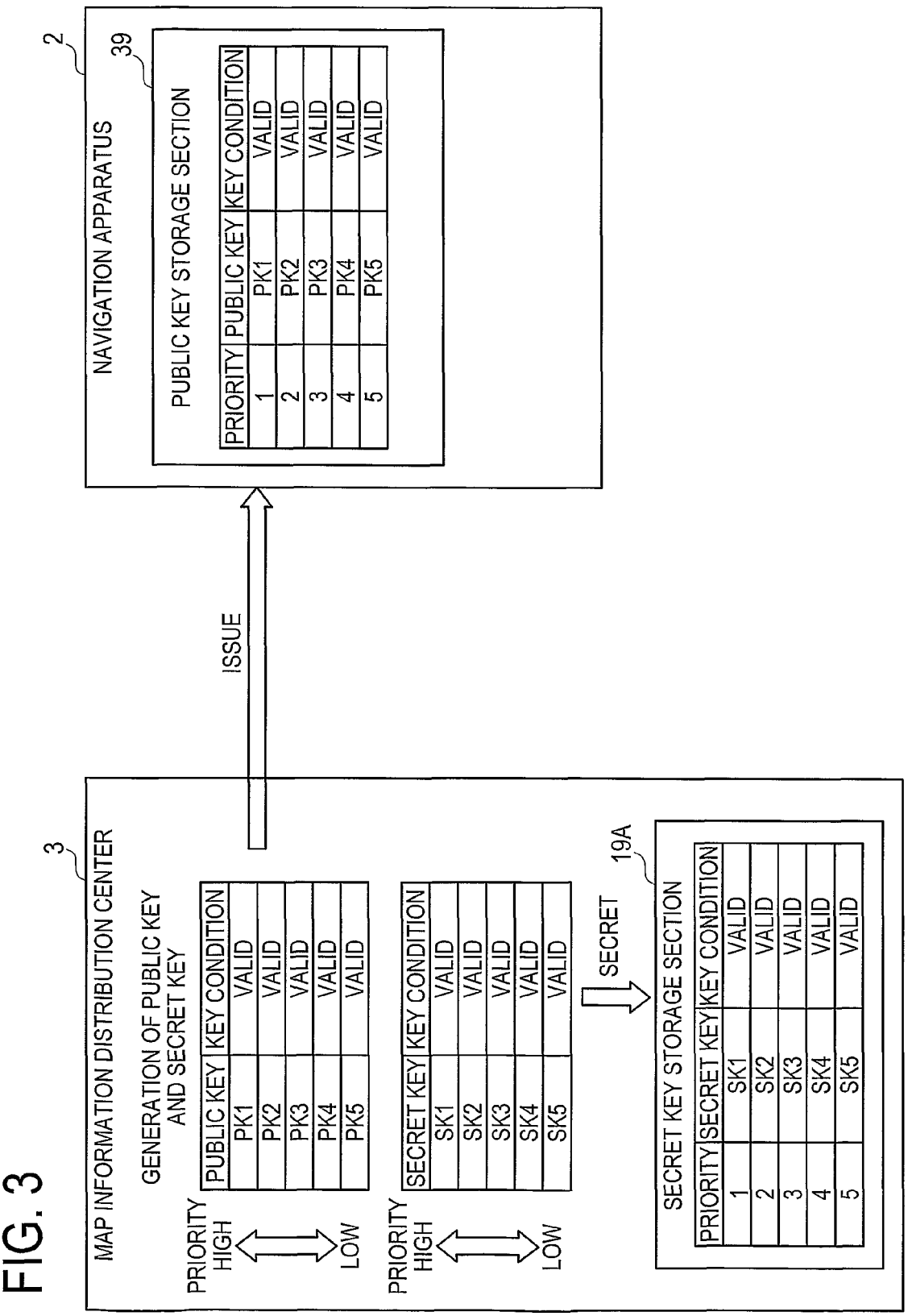
FIG. 3 is a diagram showing a generation of a public key and a secret key in a map information distribution center in the map information distribution system.

In the key information DB 19, key generating history information representing the generation of five sets of the public keys and secret keys is stored as described later. Further the key information DB 19 includes a secret key storage section 19A for storing the five generated secret keys for which priorities are set (FIG. 3).

Note that, the map information distribution center 3 may be operated by any one of an individual, a company, an association, a local government, a government-affiliated organization, or a VICS (R) center.

As the network 4, for example, any communication network such as a LAN (Local Area Network), a WAN (Wide Area Network), an intranet, a mobile phone network, a telephone network, a public communication network, a private communication network, or the Internet may be used. Further, another broadcasting satellite system such as CS broadcasting or BS broadcasting, digital terrestrial broadcasting, or FM multiple broadcasting may be used. As another communication system, an electric toll control system (ETC) used in an intelligent transportation system (ITS) or a dedicated short range communication system (DSRC) may be used as the network 4.

Next, an outline of the structure of the navigation apparatus 2 which is included in the map information distribution system 1 according to the current embodiment will be described with reference to FIG. 2.

As shown in FIG. 2, the navigation apparatus 2 in the present embodiment includes a current position detecting section 21 for detecting a current position of a vehicle in which the navigation apparatus 2 is mounted, a data storage section 22 for storing coordinates of a home position which has been registered in advance (for example, the latitude and the longitude) and/or various types of data, a navigation control section 23 for executing various types of calculations on the basis of input information, an operating section 24 for accepting operations by an operator, an LCD 25 for displaying information such as a map for the operator, a speaker 26 for outputting audio guidance according to the route guidance, a communication device 27 for communicating with a road traffic information center (VICS(R)) and/or the map information distribution center 3 through, for example, the mobile phone network, and the reading section 28 for reading map update information stored on the CD-ROM 6 as the storage medium. Further, the navigation control section 23 is connected to a vehicle speed sensor 29 for detecting a traveling speed of the vehicle in which the navigation apparatus 2 is mounted. Note that, the reading section 28 may be set for reading map information not only from the CD-ROM 6 but from a DVD.

Hereinafter, each of contents in the navigation apparatus 2 will be described. The current position detecting section 21 may include a GPS 31, a direction sensor 32, a distance sensor 33, and an altimeter (not shown), and may detect the position of the vehicle, the direction, and a distance from the vehicle to an object (for example, a distance to an intersection).

Specifically, the GPS 31 may detect a current vehicle position and a current time by receiving an electric wave provided by a satellite. The direction sensor 32, which includes a geomagnetic sensor, a gyro sensor or an optical rotation sensor, attached to a rotation section of a steering wheel (not shown), a rotation resistive sensor, or an angle sensor attached to a wheel, may detect a vehicle direction. The distance sensor 33 may detect a distance between predetermined points on a road. For example, as the distance sensor 33, a sensor for measuring a rotating speed of vehicle wheels (not shown) and detecting a distance on the basis of the rotating speed or another sensor for measuring an acceleration, integrating the acceleration twice, and detecting the distance may be used.

The data storage section 22 may include a hard disk (not shown) as an external storage device and as a storage medium, a navigation map information DB 37 stored in the hard disk, a public key storage section 39 for storing plurality of public keys issued by the map information distribution center 3, and a storage head (not shown) as a driver for reading a predetermined program as well as writing predetermined data in the hard disk. Note that, according to the current embodiment, the hard disk is used as the external storage device and as the storage medium of the data storage section 22. However, a magnetic disk such as a flexible disk may be used as the external storage device. Further, a memory card, a magnetic tape, a magnetic drum, a CD, an MD, a DVD, an optical disk, an MO, an IC card, or an optical card may be used as the external storage device.

In the navigation map information DB 37, navigation map information 38 is stored. Navigation map information 38 is used for travel guidance and route searching and is updated by the map information distribution center 3. Navigation map information 38 includes various types of information necessary for route guidance and map display as well as the update map information 17. For example, newly-created road information, map display data, intersection data representing intersections, node data representing node points, link data representing roads (links) as one type of facilities, search data for searching for a route, shop data representing POIs such as a shop as one type of facility, and/or point search data for searching for a point are included.

The contents of navigation map information DB 37 are updated by downloading difference data which is distributed by the map information distribution center 3 through the communication device 27 and/or update information such as map update information stored on the CD-ROM 6.

As shown in FIG. 2, the navigation control section 23 of the navigation apparatus 2 may include a CPU 41 as a calculating device and a control device for controlling the entire navigation apparatus 2, a RAM 42 for use as a working memory when the CPU 41 executes various types of calculation and for storing route data representing a searched route, a ROM 43 for storing a control program and a map information update processing program (FIG. 7) which is used for updating navigation map information 38 by verifying an electronic signature assigned to update map data by using public keys stored in the public key storage section 39 as described later. The navigation control section 23 of the navigation apparatus 2 may further include an internal storage device such as a flash memory 44 for storing the program read out from the ROM 43, and a tinier 45 for measuring time. Note that, a semiconductor memory or a magnetic core may be used as the RAM 42, the ROM 43, or the flash memory 44. Also, an MPU may be used as the calculating device and the control device instead of the CPU 41.

According to the current embodiment, various programs may be stored in the ROM 43 and various types of data may be stored in the data storage section 22. However, programs and data may be read out from the same external storage device or a memory card and may be written on the flash memory 44, so that the programs and data may be updated by replacing the memory card.

Support equipment (actuators) such as the operating section 24, the LCD 25, the speaker 26, the communication device 27, the reading section 28 may be electrically connected to the navigation control section 23.

The operating section 24 may be operated when the operator wants to correct a current position, when the operator inputs a starting point as a guidance starting point or a destination as a guidance ending point, and/or when the operator searches for information according to facilities. The operating section 24 may be various types of key or a plurality of operation switches. Note that, as the operating section 24, a keyboard, a mouse, or a touch panel displayed on the LCD 25 may be used.

On the LCD 25, a route guidance screen in which a map on the basis of the navigation map information 37A is displayed as well as an operation guidance, an operation menu, a key guidance, a route from a current position to a destination, guidance information along the route, and/or traffic information may be displayed.

The speaker 26 may output an audio guidance for a traveling route on the basis of control by the navigation control section 23. For example, the audio guidance may be, for example, "please turn right at XX intersection 200 meters ahead" or "map data can not be updated."

The communication device 27 is a communication means such as a mobile phone network for communicating with the information distribution center 3 and may exchange the latest version of map update information with the information distribution center 3. The communication device 27 may also receive traffic information, for example, congestion information and/or service area congestion information, transferred from the road traffic information center (VICS) as well as information from the information distribution center 3.

Next, the public key and the secret key generated by the map information distribution center 3 of the map information distribution system 1 will be described with reference to FIG. 3. FIG. 3 is a diagram showing the generation of the public key and the secret key by the map information distribution center 3 of the map information distribution system 1.

As shown in FIG. 3, the CPU 11 of the map information distribution center 3 generates five sets of public keys PK1 through PK5 and secret keys SK1 through SK5. That is, the electronic signature, which is generated by using the secret SK1, passes verification by using the public key PK1. Similarly, each electronic signature, which is generated by using each of the secret keys SK2 through SK5, passes verification by using each of the corresponding public keys PK2 through PK5.

The CPU 11 sets priorities top place to fifth position for the public keys PK1 through PK5. The CPU 11 further sets priorities top place to fifth position for the secret keys SK1 through SK5 which are corresponding to the public keys PK1 through PK5. The CPU 11 then sets all key conditions of the public keys PK1 through PK5 and the secret keys SK1 through SK5 as "valid".

The CPU 11 stores each of the secret keys SK1 through SK5 which are set priorities "1" through "5" and whose key condition are "valid" in the secret key storage section 19A.

The CPU 11 then issues the "valid" public keys PK1 through PK5 which are set priorities "1" through "5" for the navigation apparatus 2. Specifically, the CPU 11 issues the generated "valid" public keys PK1 through PK5 which are set priorities "1" through "5" to a manufacturer of the navigation apparatus 2 through an authority of the map information distribution center 3.

In response to this, the manufacturer of the navigation apparatus 2 stores the "valid" public keys PK1 through PK5 which are set priorities "1" through "5" in the public key storage section 39. As a result, it permits the CPU 41 of the navigation apparatus 2 to use the public keys PK1 through PK5 as described later and to know each of the priorities that are set "1" through "5", and each public key's condition which is currently "valid".

Next, according to the map information distribution system 1 including the structure described above, secret key update processing which is executed by the CPU 11 of the map information distribution center 3 when the authority of the map information distribution center 3 instructs the CPU 11 to invalidate the currently using secret key will be described with reference to FIG. 4 and FIG. 5.

Figure 4:
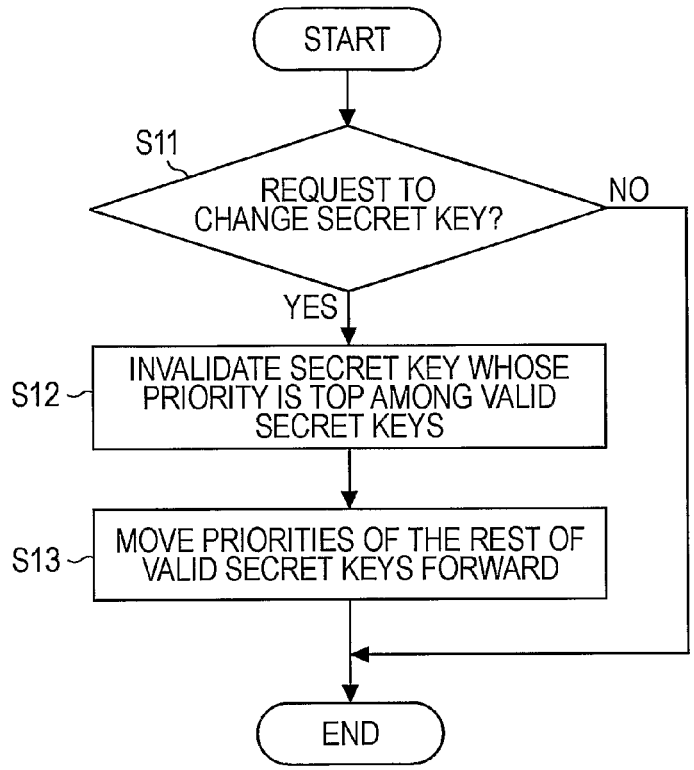
FIG. 4 is a flowchart showing secret key update processing executed by a CPU of the map information distribution center when an authority of the map information distribution center instructs the CPU to invalidate a secret key which is currently activating.

FIG. 4 is a flowchart showing the secret key update processing executed when the authority of the map information distribution center 3 instructs the CPU 11 of the map information distribution center 3 to invalidate the currently using secret key. FIG. 5 is an example when the CPU 11 of the map information distribution center 3 invalidates the secret key SK1 whose priority is top. Note that, the program shown in the flowchart of FIG. 4 is stored in the ROM 13 of the map information distribution center 3 and is executed by the CPU 11 at predetermined time intervals (for example, every 10 meter per second through every 100 meter per second).

As shown in FIG. 4, in Step S11, the CPU 11 determines whether a secret key change request, which means the currently using secret key should be invalidated, is input or not.

Note that, when the secret key whose priority is top among the all currently using secret keys SK1 through SK5 is deciphered by a third party, the authority of the map information distribution center 3 inputs the secret key change request, which means the deciphered secret key should be invalidated, to the CPU 11 with using an input means (not shown).

When the secret key change request for "invalidating" the currently using secret key is not input (Step S11=NO), the CPU 11 terminates this procedure.

Meanwhile, when the secret key change request for "invalidating" the currently using secret key is input (Step S11=YES), the CPU 11 goes to the procedure in Step S12. In S12, the CPU 11 invalidates the secret key which is currently valid and whose priority is top among the secret keys SK1 through SK5 stored in the secret key storage section 19A and again stores the secret keys in the secret key storage section 19A.

Figure 5:
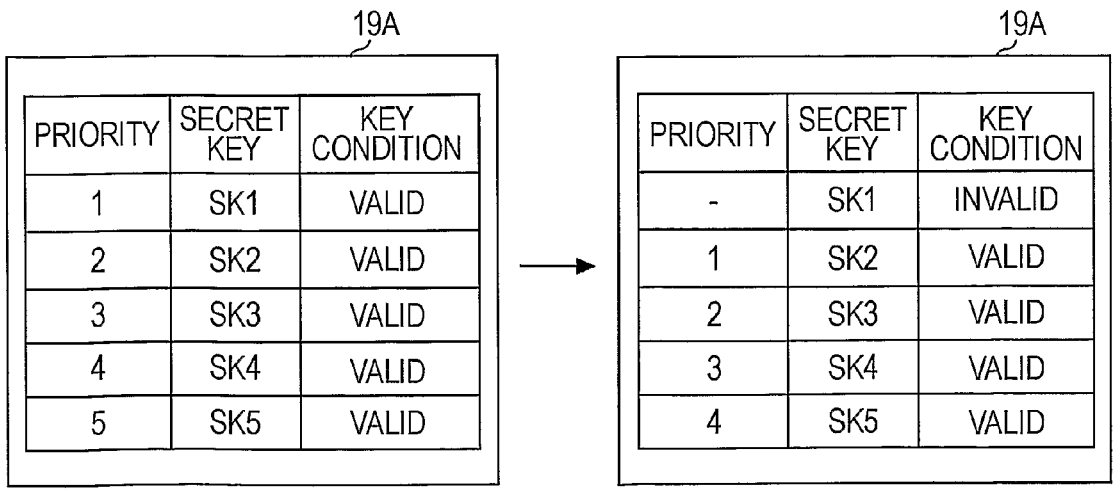
FIG. 5 is a diagram showing an example of the cases which the CPU of the map information distribution center invalidates a secret key SK1 whose priority is top.

For example, as shown in FIG. 5, when all of the secret keys SK1 through SK5 are "valid" and when the secret key change request for "invalidating" the secret key SK1 is input, the CPU 11 invalidates the secret key SK1 whose priority is top and again stores the secret key in the secret key storage section 19A.

In Step S13, the CPU 11 reads out each of the secret keys SK1 through SK5 stored in the secret key storage section 19A, moves the priorities of the only "valid" secret keys among the secret keys SK1 through SK5 forward, and again stores the secret keys in the secret key storage section 19A and terminates the procedure.

Figure 6:
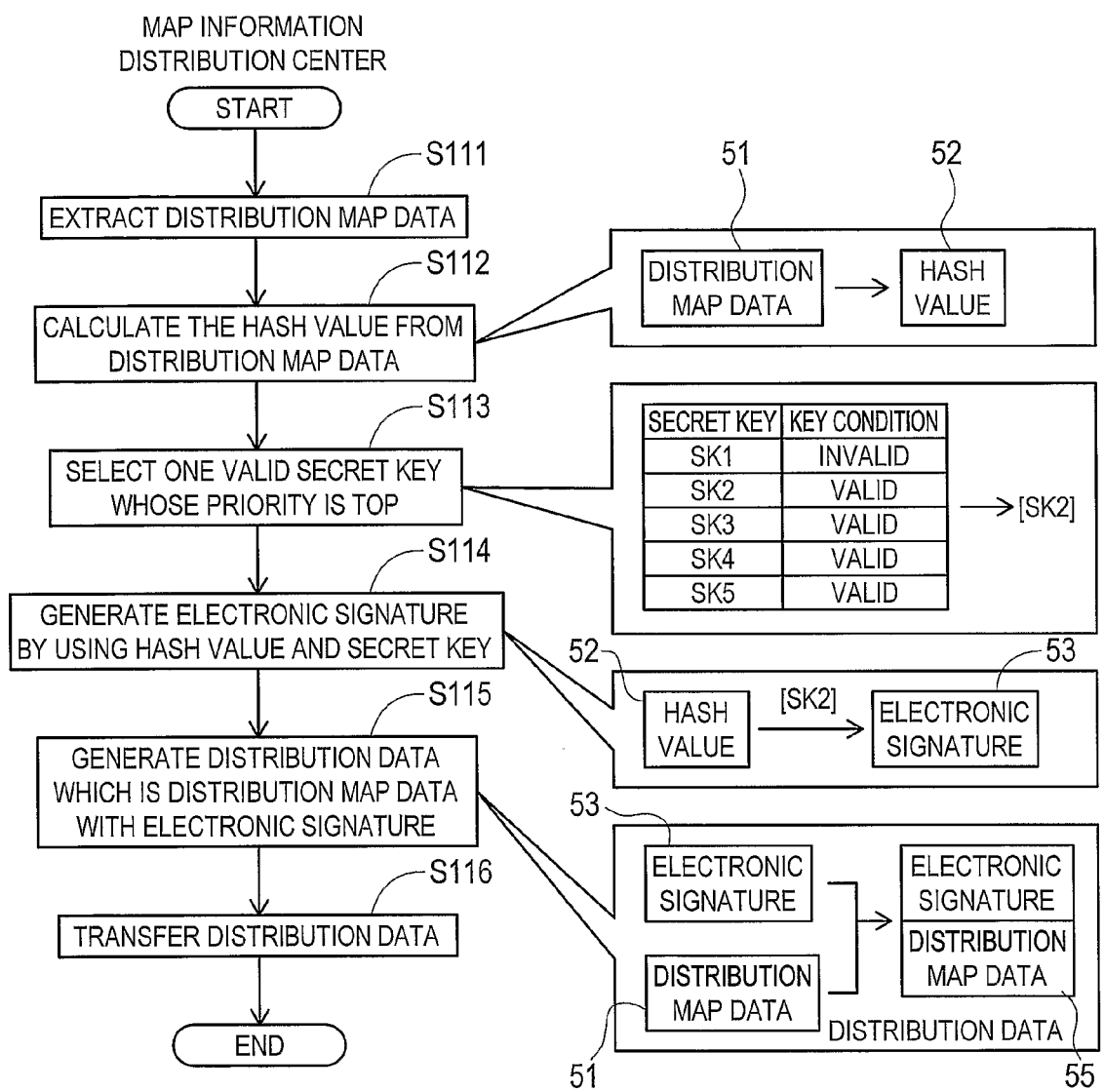
FIG. 6 is a flowchart showing map update information distributing processing executed by the CPU of the map information distribution center when the navigation apparatus or a PC requests the distribution of map update information.

For example, as shown in FIG. 5, when the secret key SK1 whose priority is top among the secret keys SK1 through SK5 is invalidated, the priority of the secret key SK1 is canceled, the priorities of the secret keys SK2 through SK5 are moved forward, that is, the priority of the secret key SK2 becomes top and the priorities of the secret keys SK3 through SK5 become second through forth position. Then the renumbered secret keys are again stored in the secret key storage section 19A. Therefore, the CPU 11 uses the secret key SK2 for the next electronic signature as described later (FIG. 6).

In other words, the secret keys SK1 through SK5 are invalidated in order of the priorities and the priorities of the only valid secret keys among all secret keys SK1 through SK5 are moved forward.

Note that, every time the secret keys SK1 through SK5 are invalidated, the CPU 11 may generate one set of one new public key and one new secret key for next use and store the set of keys in the key information DB 19 in advance. Then, when navigation map information 38 stored in each of the navigation apparatuses 2 is all updated, the newly generated public key may be issued. Specifically, when all map update information is distributed to the PC 5 of the dealer, the newly issued public key may be distributed and stored as well as all map update information on the CD-ROM 6 through the storage section 5A of the PC 5, and the public key may be supplied to the navigation apparatus 2.

Next, according to the map information distribution system 1, map update information distribution processing executed by the CPU 11 of the map information distribution center 3 when the navigation apparatus 2 or the PC 5 instructs the CPU 11 to distribute map update information will be described with reference to FIG. 6. FIG. 6 is a flowchart showing the map update information distribution processing executed by the CPU 11 of the map information distribution center 3 when the navigation apparatus 2 or the PC 5 instructs the CPU 11 to distribute map update information. Note that, the program described in the flowchart of FIG. 6 is stored in the ROM 13 of the map information distribution center 3 and executed by the CPU 11.

As shown in FIG. 6, in Step S111, when the CPU 11 receives the navigation ID as well as the request to distribute map update information from the navigation apparatus 2 or when the CPU 11 receives a user ID for specifying the user of the navigation apparatus 2 from the PC 5, the CPU 11 sets a predetermined range whose center is set at a pre-registered home position (for example, approximately 80-square-kilometer range with the home position at its center) as a distribution target area for extracting difference data corresponding to the navigation ID or the user ID. Note that, when coordinate data of a destination is received as well as the navigation ID or the user ID, the CPU 11 sets a predetermined range whose center is set at the destination (for example, approximately 50-square-kilometer range with the destination corresponding to the coordinate data at its center) as the distribution target area for extracting difference data.

Then the CPU 11 reads out update history information according to map information which is specified by the received navigation ID or the user ID from the update history information DB 15, extracts the current version of the navigation apparatus 2 which is specified with the navigation ID or the user ID and is located within each section (approximately 2.5-square-kilometer area) in the distribution target area, and stores the extracted versions. The CPU 11 reads out the file name of the latest difference data within each of sections in the distribution target area from the difference data management DB 18, extracts the file name of difference data between the current version and the latest version for the navigation apparatus 2 within each of the sections in the distribution target area, and stores the difference data in the RAM 12. Next, the CPU 11 reads out the difference data corresponding to each of the file names of the difference data from the map update information 17 and stores the data as update distribution map data in RAM 12.

In Step S112, the CPU 11 reads out update distribution map data from the RAM 12, calculates the hash value from the distribution map data, and stores the hash value in RAM 12.

For example, as shown in FIG. 6, the CPU 11 calculates a hash value 52 of the update distribution map data 51 and stores the hash value 52 in RAM 12.

In Step S113, the CPU 11 selects one secret key which is "valid" and whose priority is top among the secret keys SK1 through SK5 stored in the secret key storage section 19A of the key information DB 19 and stores the selected secret key in the RAM 12.

For example, as shown in FIG. 5 and FIG. 6, when the only secret key SK1 is "invalid" among the secret keys SK1 through SK5, the CPU 11 selects the secret keys SK2 because the secret key SK2 is "valid" and its priority is top, so that the CPU 11 stores the secret key SK2 in the RAM 12.

In Step S114, the CPU 11 reads out both of the hash value which has been calculated in Step S112 and the secret key which is "valid" and whose priority is top selected in Step S113 from the RAM 12 and generates the electronic signature by using both of the hash value and the read out secret key.

For example, as shown in FIG. 6, the CPU 11 generates an electronic signature 53 by using the hash value 52 and the secret key SK2 and stores the electronic signature 53 in the RAM 12.

In S115, the CPU 11 reads out both of update distribution map data and the electronic signature generated in S114 from the RAM 12, e-signs the electronic signature on the update distribution map data, and stores the data in RAM 12. The e-signed data is distribution data for being distributed to the navigation apparatus 2 or the PC 5.

In S116, the CPU 11 reads out the distribution data from the RAM 12 and transfers the data to the navigation apparatus 2 corresponding to the navigation ID or the PC 5 corresponding to the user ID specified in S111 through the center communication device 16, and terminates the procedure.

As the results, the navigation apparatus 2 corresponding to the navigation ID or the PC 5 corresponding to the user ID may obtain distribution data which is update distribution map data for the predetermined range whose center is at the registered home position or the destination assigned with the electronic signature through the network 4. The PC 5 may store the readable distribution data on the CD-ROM 6 as the storage medium through the storage section 5A. As a result, the user may send the distribution data to the navigation apparatus 2 once inserting the CD-ROM 6 into the reading section 28 of the navigation apparatus 2.

For example, as shown in FIG. 6, the CPU 11 reads out the update distribution map data 51 and the electronic signature 53 from the RAM 12, e-signs the electronic signature 53 on the distribution map data 51 which is the distribution data 55 for being distributed to the navigation apparatus 2 or the PC 5, and stores the data in RAM 12. The CPU 11 reads out the distribution data 55 from the RAM 12 and transfers the distribution data to the navigation apparatus 2 corresponding to the navigation ID or the PC 5 corresponding to the user ID specified in S111 via the center communication device 16.

Thereby, the navigation apparatus 2 corresponding to the navigation ID or the PC 5 corresponding to the user ID may obtain the distribution data 55 which is the update distribution map data 51 to which the electronic signature 53 is assigned for the predetermined range whose center is set at the registered home position or the destination via the network 4. Then the PC 5 may store the readable distribution data 55 on the CD-ROM 6 as the storage medium via the storage section 5A. As a result, the user may send the distribution data 55 to the navigation apparatus 2 once inserting the CD-ROM 6 into the reading section 28 of the navigation apparatus 2.

Next, according to the map information distribution system 1, map information update processing executed by the CPU 41 of the navigation apparatus 2 when the CPU 41 obtains distribution data which is update distribution map data (hereinafter referred to as "map update information") with the electronic signature from the information distribution center 3 through the network 4 or the CD-ROM 6 may be described with reference to FIG. 7 through FIG. 13.

Figure 7:
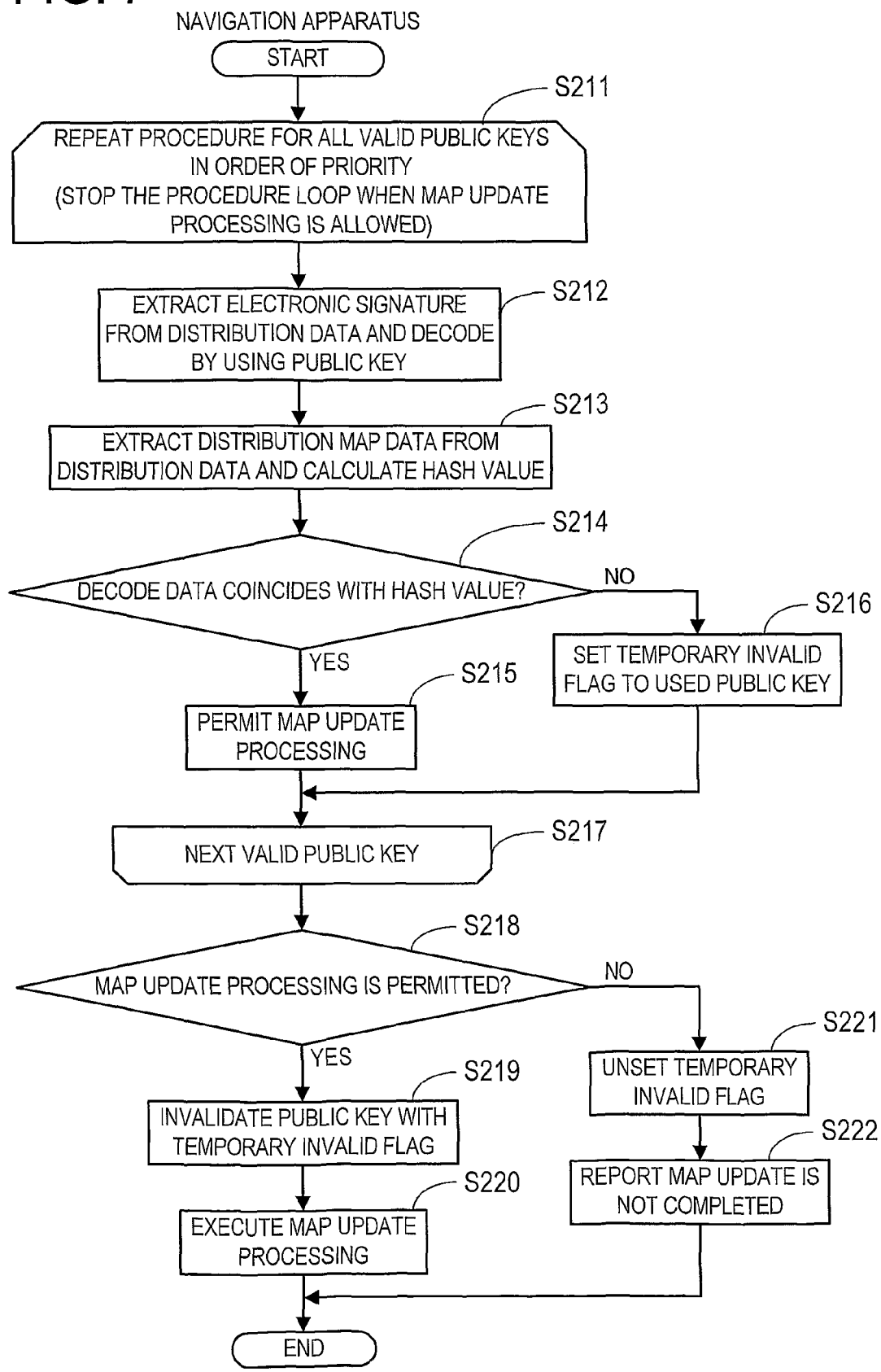
FIG. 7 is a flowchart showing map information update processing executed by the CPU of the navigation apparatus when the navigation apparatus obtains distribution data which is map update information with an electronic signature and distributed from the information distribution center.

FIG. 7 is a flowchart showing the map information update processing executed by the CPU 41 of the navigation apparatus 2 when the CPU 41 obtains the distribution data which is map update information with the electronic signature distributed from the information distribution center 3 through the network 4 or the CD-ROM 6. Note that, the program shown in the flowchart of FIG. 7 is stored in the ROM 43 of the navigation apparatus 2 and is executed by the CPU 41.

As shown in FIG. 7, in Step S211, the CPU 41 reads out one public key whose priority is top among "valid" ones of the public keys PK1 through PK5 stored in the public key storage section 39 and stores the read out public key in the RAM 42.

For example, as shown in FIG. 3, when all of the public keys PK1 through PK5 are "valid", the CPU 41 reads out the public key PK1 whose priority is top from the public key storage section 39 and stores the public key PK1 in the RAM 42.

In S212, the CPU 41 extracts the electronic signature from the distribution data distributed from the information distribution center 3 through the network 4 or the CD-ROM 6 and stores the electronic signature in the RAM 42. The CPU 41 reads out both of the public key whose priority is top and the electronic signature from the RAM 42, decodes the electronic signature by using the public key, and stores decode data in the RAM 42.

In S213, the CPU 41 extracts map update information from the distribution data which is distributed from the information distribution center 3, calculates the hash value from the map update information, and stores the hash value in the RAM 42.

Next, in S214, the CPU 41 reads out both of the decode data of the electronic signature and the hash value of map update information from the RAM 42 and determines whether the decode data coincides with the hash value. When the decode data coincides with the hash value, that is, when the electronic signature passes verification (S214=YES), the procedure goes to S215.

In S215, the CPU 41 determines that the electronic signature has been generated by using the secret key corresponding to the public key whose priority is top, that is, the CPU 41 determines that the distribution data which is distributed from the information distribution center 3 is valid information and sets an update permission flag to map update information of the distribution data. The CPU 41 again stores the data in the RAM 42 and the procedure goes to S217.

Meanwhile, when the decode data of the electronic signature does not coincide with the hash value of map update information (S214=NO), the CPU 41 determines that the electronic signature has not passed verification by using the public key, that is, the CPU 41 determines that the electronic signature is not generated by using the secret key corresponding to the public key whose priority is top, so that the procedure goes to S216.

In S216, the CPU 41 further determines that the secret key corresponding to the used public key has been deciphered by a third party, so that the CPU 41 sets a temporarily invalid flag to the used public key, stores the public key in the RAM 42, and the procedure goes to S217.

In S217, the CPU 41 reads out the used public key from the RAM 42. If the temporarily invalid flag is set to the public key, the CPU 41 repeats all procedures after S211 again.

Specifically, the CPU 41 reads out one public key whose priority is the following number of the priority of which the public key with the temporarily invalid flag among all valid ones of the public keys PK1 through PK5 from the public key storage section 39, stores the selected public key in the RAM 42, and repeats all procedures after S211 again.

Meanwhile, in S217, the CPU 41 reads out the used public key from the RAM 42. When the temporarily invalid flag is not set to the public key, the CPU 41 terminates the loop of procedures and the procedure goes to S218.

In S218, the CPU 41 reads out map update information from the RAM 42 and determines whether map update processing for the map update information is allowed, that is, whether the update permission flag is set to the map update information or not.

When the update permission flag is set to the map update information (S218=YES), the procedure goes to S219.

In S219, when the public key with the temporarily invalid flag is stored in the RAM 42, the CPU 41 reads out the public key with the temporarily invalid flag, invalidates the public key, and stores the public key back to the public key storage section 39. Then the CPU 41 moves priorities of "valid" public keys forward among the public keys PK1 through PK5 and stores the public keys back in the public key storage section 39. Then the procedure goes to S220.

An example of the procedure in S219 will be described with reference to FIG. 8 through FIG. 10.

Figure 8:
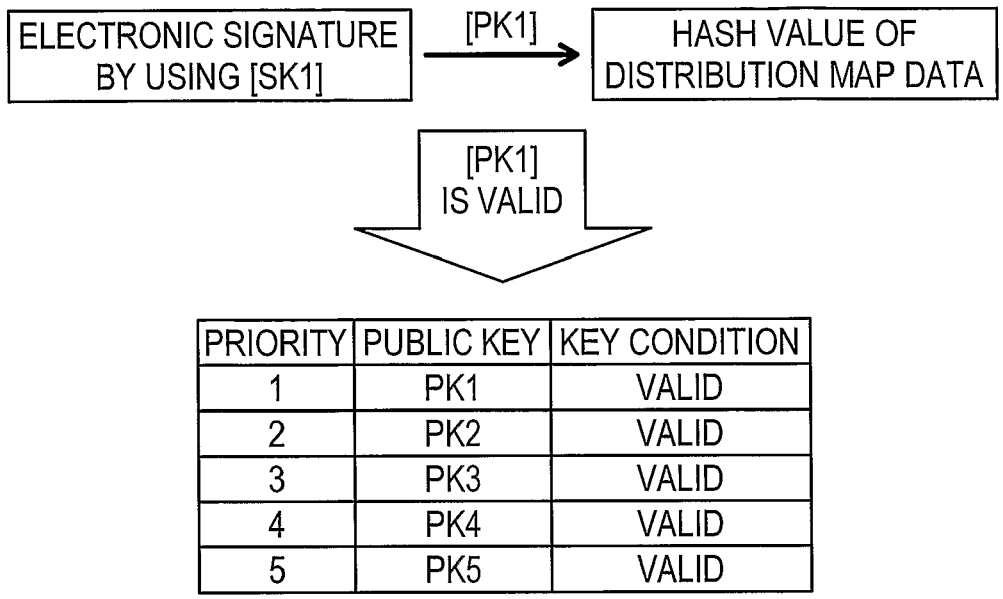
FIG. 8 is a diagram showing key conditions of public keys PK1 through PK5 stored in a public key storage section when decode data of the electronic signature generated by using the valid public key PK1 coincides with a hash value of map update information.

FIG. 8 is a diagram showing conditions of the public keys PK1 through PK5 stored in the public key storage section 39 when the decode data of the electronic signature generated by using the "valid" public key PK1 coincides with the hash value of map update information. FIG. 9 is a diagram showing conditions of the public keys PK1 through PK5 stored in the public key storage section 39 when the decode data of the electronic signature generated by using the "valid" public key PK1 does not coincide with the hash value of map update information and when the decode data of the electronic signature generated by using the "valid" public key PK2 coincides with the hash value of map update information. FIG. 10 is a diagram showing conditions of the public keys PK1 through PK5 stored in the public key storage section 39 when the public key PK1 is invalidated and when the decode data of the electronic signature generated by using the "valid" public key PK2 coincides with the hash value of map update information.

First, as shown in FIG. 8, the CPU 41 generates decode data of the electronic signature of the distribution data distributed from the information distribution center 3 by using the "valid" public key PK1 whose priority is top. When the decode data of the electronic signature coincides with the hash value calculated from map update information of the distribution data, that is, when the electronic signature passes verification, the CPU 41 determines that the electronic signature has been generated by using the secret key SK1 corresponding to the public key PK1 whose priority is top, that is, the CPU 41 determines that the distribution data which is distributed from the information distribution center 3 is valid information. Therefore, the CPU 41 sets the update permission flag to map update information of the distribution data and stores the data back in the RAM 42. The CPU 41 further determines that the public key PK1 whose priority is top is "valid", sets the statuses of the public keys PK1 through PK5 as "valid", and stores the public keys PK1 through PK5 in the public key storage section 39 with setting priorities top to fifth position.

Figure 9:
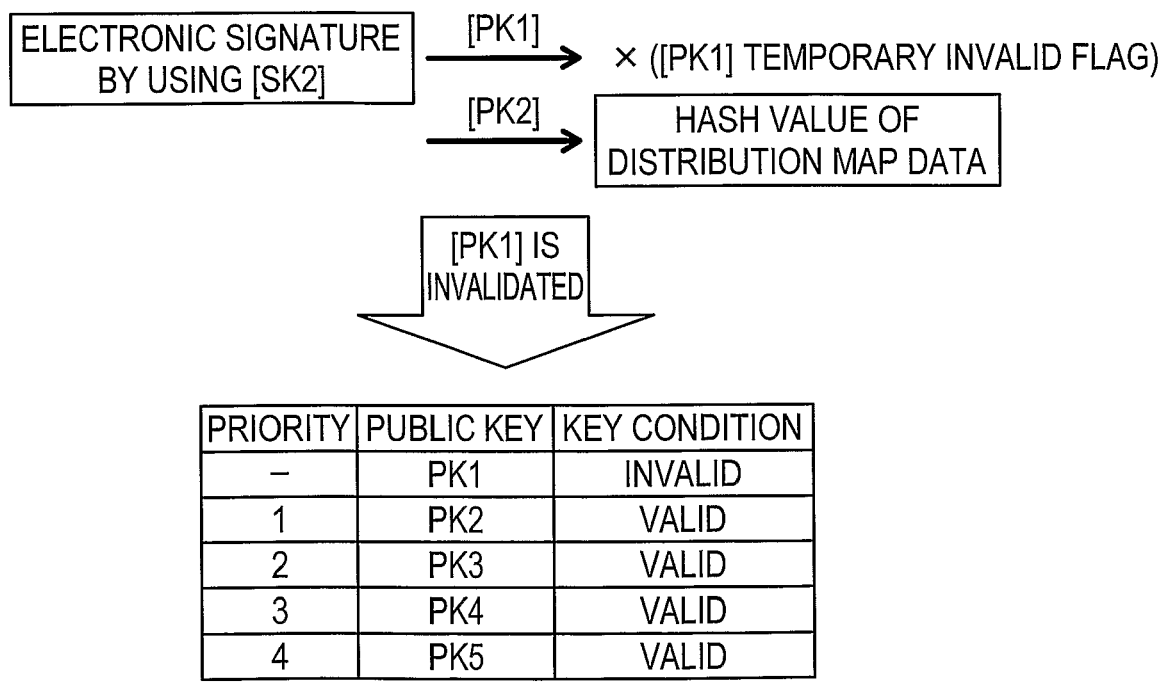
FIG. 9 is a diagram showing key conditions of public keys PK1 through PK5 stored in the public key storage section when decode data of the electronic signature generated by using the valid public key PK2 coincides with the hash value of map update information.

Further as shown in FIG. 9, the CPU 41 generates the decode data of the electronic signature of the distribution data distributed from the information distribution center 3 by using the "valid" public key PK1 whose priority is top. When the decode data of the electronic signature does not coincide with the hash value calculated from map update information of the distribution data, that is, when the electronic signature does not pass verification, the CPU 41 sets the temporarily invalid flag to the public key PK1 whose priority is top and stores the public key PK1 in the RAM 42.

Next, the CPU 41 generates the decode data of the electronic signature by using the "valid" public key PK2 whose priority is second. When the decode data of the electronic signature coincides with the hash value calculated from map update information of the distribution data, that is, when the electronic signature passes verification, the CPU 41 determines that this electronic signature has been generated by using the secret key SK2 corresponding to the public key PK2 whose priority is second, that is, the CPU 41 determines that the distribution data distributed from the information distribution center 3 is valid information, sets the update permission flag to map update information of the distribution data, and stores the data back in the RAM 42.

Further, the CPU 41 reads out the public key PK1 with the temporarily invalid flag from the RAM 42, invalidates the public key PK1, and stores the PK1 back in the public key storage section 39. The CPU 41 moves the priorities of the "valid" public keys PK2 through PK5 forward and stores the public keys in the public key storage section 39. Therefore, as shown in FIG. 9, the priority of the public key PK2 is set as top and the priorities of the public keys PK3 through PK5 are set as second through forth position.

Figure 10:
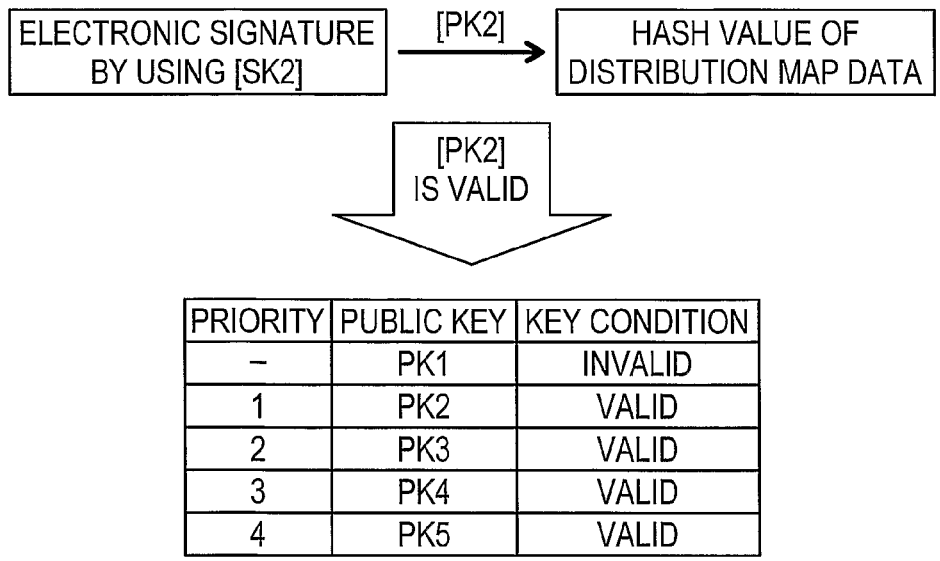
FIG. 10 is a diagram showing key conditions of public keys PK1 through PK5 stored in the public key storage section when the public key PK1 is invalidated and when decode data of the electronic signature generated by using the valid public key PK2 coincides with the hash value of map update information.

As shown in FIG. 10, when the public key PK1 is "invalid", the CPU 41 generates the decode data of the electronic signature of the distribution data which is distributed from the information distribution center 3 by using the "valid" public key PK2 whose priority is top. When the decode data of the electronic signature coincides with the hash value calculated from map update information of the distribution data, that is, when the electronic signature passes verification, the CPU 41 determines that this electronic signature has been generated by using the secret key SK2 corresponding to the public key PK2 whose priority is top, that is, the CPU 41 determines that the distribution data distributed from the information distribution center 3 is valid information, sets the update permission flag to map update information of the distribution data, and stores the data back in the RAM 42. The CPU 41 determines that the public key PK2 whose priority is top is "valid", sets the statuses of the public keys PK2 through PK5 as "valid", and stores the public keys in the public key storage section 39 with setting priorities top to fourth position.

As shown in FIG. 7, in S220, The CPU 41 reads out map update information of the distribution data which is distributed from the information distribution center 3, that is, difference data from the RAM 42, updates map information about the distribution target area of the navigation map information 38 (for example, approximately 80-square-kilometer range with the home position at its center) to the latest version of map information, and terminates the procedure.

Meanwhile, when the map update processing for map update information is not allowed, that is, when the update permission flag is not set to the map update information (S218=NO), the CPU 41 determines that the distribution data which is distributed from the information distribution center 3 is invalid information and the procedure goes to S221.

In S221, the CPU 41 reads out any public key with the temporarily invalid flag from the RAM 42, unsets all of the temporarily invalid flags from the public keys, and stores the public keys as "valid" keys in the public key storage section 39.

In S222, the CPU 41 reports that the map information of the distribution target area of the navigation map information 38 (for example, approximately 80-square-kilometer range with the home position at its center) can not be updated to the latest version of map information because the distribution data which is distributed from the information distribution center 3 is invalid information and terminates the procedure. For example, the CPU 41 may display a message such as "map update has been failed" on the LCD 25 with an audio guidance such as "map data can not be updated" through the speaker 26.

According to the procedure in S211 through S217, an example when the temporarily invalid flags are set to all "valid" public keys which are stored in the public key storage section 39 and any electronic signature can not pass verification will be described with reference to FIG. 11 through FIG. 13.

First, an example of when the electronic signature does not pass verification because the electronic signature of the obtained distribution data has been generated by using the "invalid" secret key SK1 will be described with reference to FIG. 11. FIG. 11 is a diagram showing an example when the electronic signature does not pass verification because the electronic signature of the obtained distribution data has been generated by using the "invalid" secret key SK1.

Figure 11:
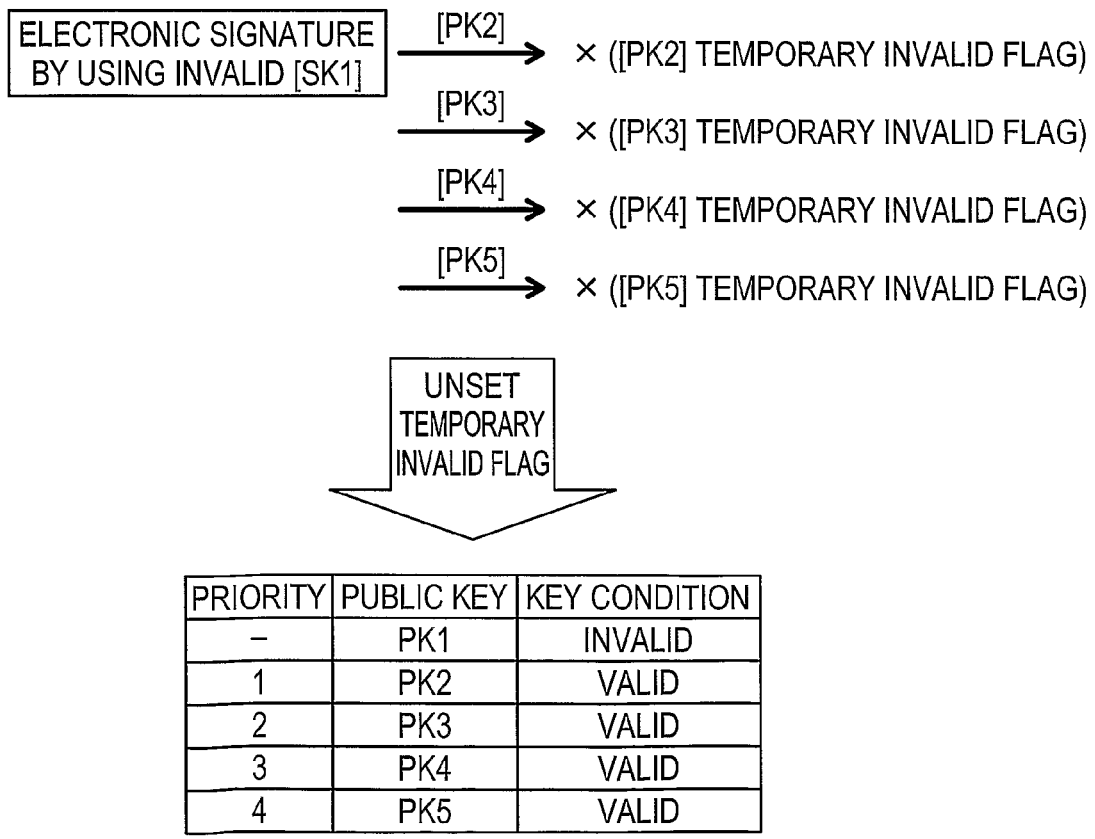
FIG. 11 is a diagram showing key conditions of public keys PK1 through PK5 stored in the public key storage section when the electronic signature of the obtained distribution data is generated by using the invalid secret key SK1.

As shown in FIG. 11, when the electronic signature of the obtained distribution data has been generated by using the invalid secret key SK1, that is, when the public key PK1 is "invalid", the CPU 41 generates the decode data of the electronic signature of the distribution data which is distributed from the information distribution center 3 by using the "valid" public key PK2 whose priority is top.

In this case, the decode data of the electronic signature does not coincide with the hash value calculated from map update information of the distribution data, that is, the electronic signature does not pass verification. Therefore, the CPU 41 sets the temporarily invalid flag to the public key PK2 whose priority is top and stores the PK2 in the RAM 42. Similarly, the CPU 41 further generates the decode data of the electronic signature by using each of the "valid" public keys PK 3 through PK5 in order of the priorities. In this case, any one of the decode data of the electronic signature does not coincide with the hash value calculated from map update information, that is, any electronic signature does not pass verification. Therefore, the CPU 41 sets the temporarily invalid flags to each of the public keys PK3 through PK5 and stores the PK3 through PK5 back in the RAM 42.

In S218, after the CPU 41 determines that the distribution data which is distributed from the information distribution center 3 is invalid information, the procedure goes to S221. The CPU 41 unsets all of the temporarily invalid flags to the public keys PK2 through PK5 and stores the public keys PK2 through PK5 as "valid" keys back in the public key storage section 39.

Next, an example when the electronic signature does not pass verification because map update information of the obtained distribution data has been destroyed resulting from a communication failure or tampered will be described with reference to FIG. 12. FIG. 12 is a diagram showing an example when the electronic signature does not pass verification because map update information of the obtained distribution data has been destroyed resulting from a communication failure or tampered.

Figure 12:
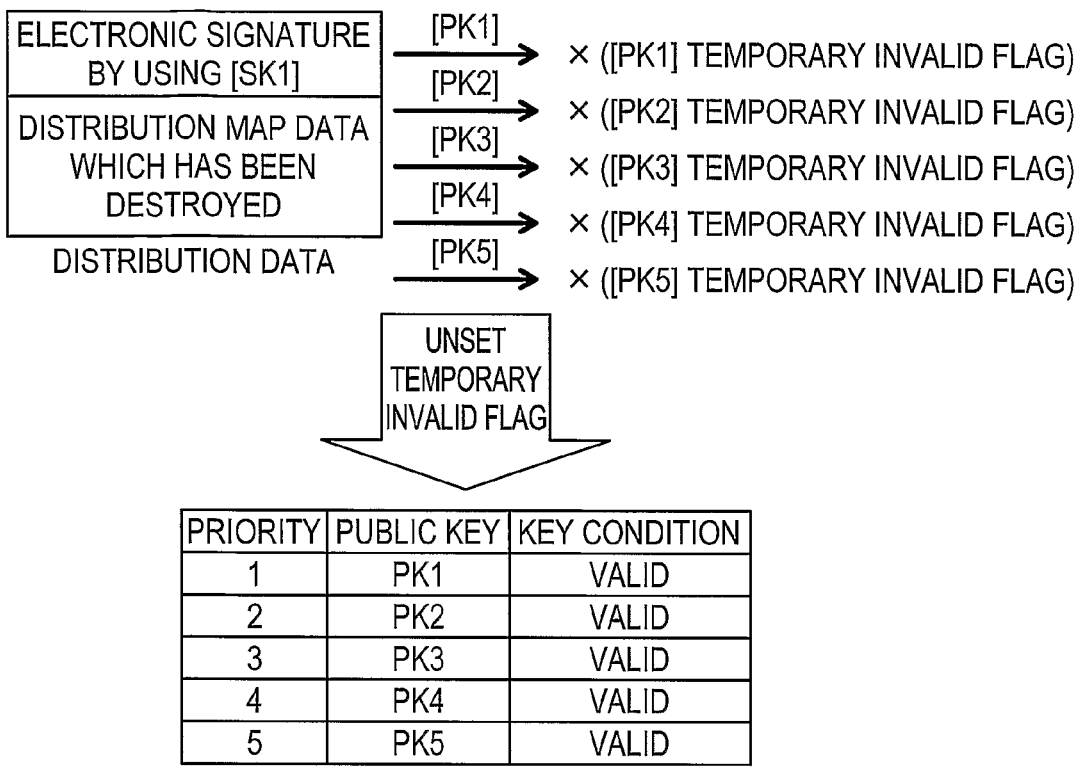
FIG. 12 is a diagram showing key conditions of public keys PK1 through PK5 stored in the public key storage section when map update information data taken from the obtained distribution data is destroyed resulting from a communication failure or tempered.

As shown in FIG. 12, when all of the public keys PK1 through PK5 are valid and map update information of the obtained distribution data has been destroyed resulting from a communication failure or tampered, the CPU 41 generates the decode data of the electronic signature of the distribution data which is distributed from the information distribution center 3 (that is, generated by using the secret key SK1) by using the "valid" public key PK1 whose priority is top.

In this case, the decode data of the electronic signature does not coincide with the hash value calculated from map update information, which has been destroyed or tampered, taken from the distribution data, that is, the electronic signature does not pass verification. Therefore, the CPU 41 sets the temporarily invalid flag to the public key PK1 whose priority is top and stores the PK1 in the RAM 42. The CPU 41 further generates the decode data of the electronic signature by using the "valid" public keys PK2 through PK5 in order of the priorities. In this case, any one of the decode data of the electronic signature does not coincide with the hash value calculated from map update information which has been destroyed or tampered, that is, the electronic signature does not pass verification. Therefore, the CPU 41 sets the temporarily invalid flags to the public keys PK2 through PK5 and stores the public keys PK2 through PK5 in the RAM 42.

In S218, after the CPU 41 determines that the distribution data distributed from the information distribution center 3 is invalid information, the procedure goes to S221. The CPU 41 unsets all of the temporarily invalid flags to the public keys PK1 through PK5 and stores the public keys PK1 through PK5 as "valid" public keys back in the public key storage section 39.

Next, an example when the electronic signature does not pass verification because the electronic signature of the obtained distribution data is generated by using one secret key other than the secret keys SK1 through SK5 will be described with reference to FIG. 13. FIG. 13 is a diagram showing the example when the electronic signature does not pass verification because the electronic signature of the obtained distribution data is generated by using one secret key other than the secret keys SK1 through SK5.

Figure 13:
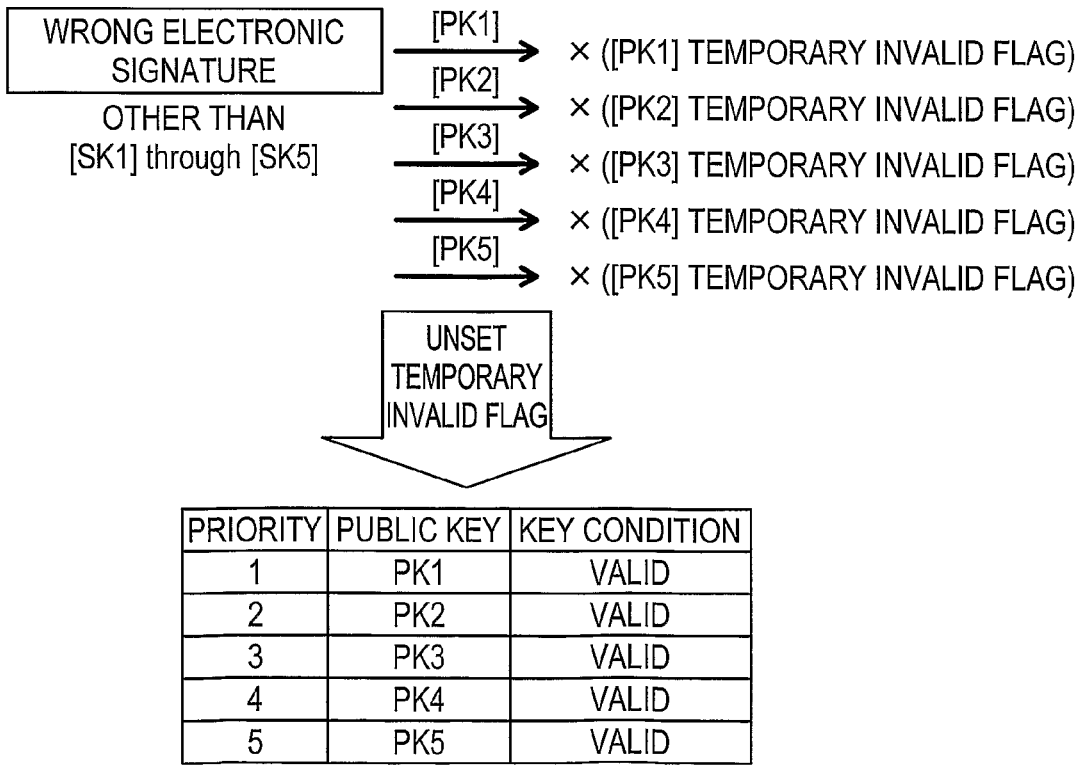
FIG. 13 is a diagram showing key conditions of public keys PK1 through PK5 stored in the public key storage section when the electronic signature of the obtained distribution data is generated by using a secret key other than the secret keys SK1 through SK5.

As shown in FIG. 13, when all of the public keys PK1 through PK5 are valid and the electronic signature of the obtained distribution data is generated by using one secret key other than the secret keys SK1 through SK5, the CPU 41 generates the decode data of the electronic signature of the distribution data distributed from the information distribution center 3 by using the "valid" public key PK1 whose priority is top.

In this case, the decode data of the electronic signature does not coincide with the hash value calculated from map update information of the distribution data, that is, the electronic signature does not pass verification. Therefore, the CPU 41 sets the temporarily invalid flag to the public key PK1 whose priority is top and stores the public key PK1 in the RAM 42. The CPU 41 further generates the decode data of the electronic signature by using the "valid" public keys PK2 through PK5 in order of the priorities. In this case, any one of the decode data of the electronic signature does not coincide with the hash value calculated from map update information, that is, the electronic signature does not pass verification. Therefore, the CPU 41 sets the temporarily invalid flags to the public keys PK2 through PK5 and stores the public keys PK2 through PK5 in the RAM 42.

In S218, after the CPU 41 determines that the distribution data which is distributed from the information distribution center 3 is invalid information, the procedure goes to S221. The CPU 41 unsets all of the temporarily invalid flags to the public keys PK1 through PK5 and stores the PK1 through PK5 as "valid" public keys back in the public key storage section 39.

As described in detail above, according to the map information distribution system 1 in the current embodiment, the CPU 11 of the information distribution center 3 generates five sets of the public keys PK1 through PK5 and the secret keys SK1 through SK5 and sets priorities top to fifth position to both of the public keys PK1 through PK5 and the secret keys SK1 through SK5. Then the CPU 11 of the information distribution center 3 stores the secret keys SK1 through SK5 with the priorities in the secret key storage section 19A.

The CPU 11 of the information distribution center 3 issues the public keys PK1 through PK5 with the priorities to the navigation apparatus 2. The CPU 11 of the information distribution center 3 calculates the hash value from map update information, generates the electronic signature by using both of the hash value and the secret key whose priority is top in the secret key storage section 19A, generates distribution data which is map update information with the electronic signature, and distributes the distribution data to the navigation apparatus 2 or the PC 5 through the network 4 (S111 through S116).

The CPU 41 of the navigation apparatus 2 stores the public keys PK1 through PK5 with the priorities which are published by the information distribution center 3 in the public key storage section 39. The CPU 41 of the navigation apparatus 2 extracts the electronic signature of the distribution data distributed from the information distribution center 3, generates the decode data of the electronic signature by using only "valid" public keys among the public keys PK1 through PK5 in order of the priorities, and verifies the electronic signature in order by determining whether the decode data of the electronic signature coincides with the hash value calculated from map update information. When the electronic signature passes verification, the CPU 41 of the navigation apparatus 2 determines that the distribution data which is distributed from the information distribution center 3 is valid information (S211 through S217).

The CPU 11 of the information distribution center 3 generates the electronic signature by using the "valid" secret key whose priority is top among the secret keys SK1 through SK5 with each priority and transfers the distribution data which is map update information with the electronic signature. Thereby, it is possible to ensure the security of distributed map update information. Further, because the five secret keys SK1 through SK5 are stored in the secret key storage section 19A in advance, even when a third party deciphers the secret key whose priority is top, it may be possible to switch the deciphered secret key to one of the rest of the secret keys quickly.

The CPU 41 of the navigation apparatus 2 verifies the electronic signature extracted from the distribution data which is distributed from the information distribution center 3 by using the public key whose priority is top among the public keys PK1 through PK5 which are stored in the public key storage section 39. Even if the electronic signature does not pass verification, it is possible for the CPU 41 to verify the electronic signature by using the public key which has the following number of the priority without being issued a new public key by a certificate authority provided by a reliable third party. Therefore, it may be possible to verify the electronic signature quickly and to reduce the cost of the verification.

When the electronic signature passes verification by using the public keys PK1 through PK5 which are published by the information distribution center 3, the CPU 41 of the navigation apparatus 2 determines that the distribution data distributed from the information distribution center 3 is valid information. Therefore, the security of the map update information distributed to the navigation apparatus 2 may be ensured.

When a third party has deciphered the secret key whose priority is top stored in the secret key storage section 19A, the CPU 11 of the information distribution center 3 invalidates the secret key whose priority is top, moves the priorities of the rest of the secret keys forward, and stores the secret keys back in the secret key storage section 19A (S11 through S13).

Thereby, even if a third party has been deciphered the secret key whose priority is top, the deciphered secret key whose priority is top is invalidated and it may be possible to quickly stop the use of the deciphered secret key by the third party. That is, the security of map update information distributed to the navigation apparatus 2 may be ensured. When the secret key whose priority is top is invalidated, the priorities of the rest of the secret keys are moved forward and stored back in the secret key storage section 19A, so that it may be possible to quickly switch the secret key who priority is top to one of the rest of the secret keys and to generate the electronic signature by using the hash value calculated from map update information.

The CPU 41 of the navigation apparatus 2 verifies the electronic signature by using the "valid" public keys among the public keys PK1 through PK5 in order of the priorities. If there is any public key which has not passed verification before the electronic signature passes verification, the temporarily invalid flag is set to such a public key and the public key is stored in the RAM 42. When the electronic signature extracted from the distribution data has passed verification, the CPU 41 invalidates the public key with the temporarily invalid flag, moves the priorities of the rest of the public keys forward, and stores the public keys back in the public key storage section 39 (S214=NO through S219).

In response to this, when a third party has deciphered the secret key whose priority is top and which is stored in the secret key storage section 19A, the CPU 11 of the information distribution center 3 invalidates the deciphered secret key, moves the priorities of the rest of the secret keys forward, and stores the secret keys back in the secret key storage section 19A. Therefore, even if the new electronic signature is generated by using the secret key whose priority has been switched to top, the CPU 41 of the navigation apparatus 2 may surely invalidate the public key corresponding to the deciphered secret key without receiving any data of the public key corresponding to the deciphered secret key from the information distribution center 3.

When the CPU 41 of the navigation apparatus 2 invalidates the public key corresponding to the deciphered secret key, the CPU 41 may move the priorities of the "valid" public keys forward among the rest of the public keys PK1 through PK5 and smoothly verify the electronic signature extracted from the distribution data by using the "valid" public keys in order of the priorities without being published the new public key from a certificate authority provided by a reliable third party.

Further, while the CPU 41 of the navigation apparatus 2 verifies the electronic signature extracted from the distribution data by using the "valid" public keys among the public keys PK1 through PK5 in order of the priorities, when the electronic signature does not pass verification, the CPU 41 sets the temporarily invalid flag to each of the used public keys in order and stores such public keys in the RAM 42. When the electronic signature does not pass verification even by using any "valid" public key, the CPU 41 unsets all of the temporarily invalid flags to the public keys and stores the public keys as "valid" public keys in the public key storage section 39. The CPU 41 further determines that the obtained distribution data is invalid information (S214=NO through S216 and S216 through S221).

Therefore, when a malicious third party sets the electronic signature to map update information by using the different secret key from any of the secret keys owned by the information distribution center 3, the temporarily invalid flags are set to each of the public keys to prevent the electronic signature from passing verification by using all of the valid public keys. However, the CPU 41 may unset all of the temporarily invalid flags, so that the validity of all of the "valid" public keys may be maintained and the security of map update information to be distributed may be ensured because the CPU 41 may determine that the distribution data is invalid information.

The CPU 11 of the information distribution center 3 calculates the hash value from map update information which is distributed to the navigation apparatus 2 or the PC 5 and generates the electronic signature by using both of the hash value and the secret key whose priority is top stored in the secret key storage section 19A. The CPU 41 of the navigation apparatus 2 generates the decode data of the electronic signature which is extracted from the obtained distribution data by using the only valid public keys among the public keys PK1 through PK5 in order of the priorities.

The CPU 41 of the navigation apparatus 2 hashes map update information which is extracted from the obtained distribution data. When the hash value coincides with the decode data, the CPU 41 makes the electronic signature pass verification. When the hash value does not coincide with the decode data, the CPU 41 does not allow the electronic signature to pass verification.

Thereby, the CPU 11 of the information distribution center 3 generates the electronic signature by using both of the hash value calculated from map update information to be distributed and the "valid" secret key whose priority is top stored in the secret key storage section 19A, so that it may be possible to generate the electronic signature quickly. Not only when a malicious third party sets the electronic signature to map update information by using the different secret key from any one of the secret keys SK1 through SK5 owned by the information distribution center 3 but when map update information is tampered without changing the electronic signature, the CPU 41 of the navigation apparatus 2 does not allow the electronic signature to pass verification and may detect the change of the map update information if the hash value does not coincide with the decode data, so that the security of map update information may be ensured.

Note that, the present invention need not be limited by the above-described embodiment. Various changes may be made without departing from the broad spirit and scope of the underlying principles.

For example, In case of that the navigation apparatus 2 does not include the communication device 27, the user of the navigation apparatus 2 may transfer the user ID to specify the user which has been registered in the information distribution center 3 in advance through the network 4 to the information distribution center 3 while requesting for the distribution of map update information through the PC 5.

Therefore, the PC 5 may obtain the distribution data which is map update information with the electronic signature about a predetermined range with a registered user's home position or a destination at its center from the information distribution center 3 through the network 4. Further, the PC 5 may store the obtained readable distribution data on the CD-ROM 6 as the storage medium through the storage section 5A. Thereby, once the CD-ROM 6 is inserted to the reading section 28 of the navigation apparatus 2, it may be possible for the PC 5 to transfer map update information to the navigation apparatus 2 even though the navigation apparatus 2 does not include the communication device 27.

The invention claimed is:

1. An information distribution system, comprising:
an information distribution center for distributing map information; and
a navigation apparatus, wherein:
the information distribution center further comprises:
  a key generating device that generates a plurality of sets of one public key and one secret key and setting priorities for the plurality of sets of one public key and one secret key;
  a secret key storage device that stores the plurality of secret keys with the priorities;
  an electronic signature generating device that generates an electronic signature by using one secret key whose priority is stored as being top in the secret key storage device;
  a distributing device that distributes the map information with the electronic signature;
  an input device that accepts an input of a secret key change request for a secret key whose priority is top; and
  a change request determining device that determines whether the secret key change request for a secret key whose priority is top has been input on the input device,
  wherein if the change request determining device determines that the secret key change request for the secret key whose priority is top has been input on the input device, the key generating device invalidates the secret key whose priority is top; and
the navigation apparatus further comprises:
  a public key storage device that stores the plurality of public keys with the priorities issued by the information distribution center;
  an electronic signature extracting device that extracts the electronic signature set for the map information which is distributed from the information distribution center;
  a verification control device that performs control to verify the electronic signature by using the plurality of the public keys with the priorities in order of the priorities; and
  a determining device that determines that the map information is valid information distributed from the information distribution center, provided that the electronic signature passes verification,
  wherein the verification control device performs control to, provided that there is a public key which does not pass the verification before the electronic signature passes the verification, set the public key which does not pass the verification as invalid.

2. The information distribution system of claim 1, wherein:
the verification control device comprises:
a temporarily invalid setting device that sets the public key which does not pass the verification as the temporarily invalid key, wherein:
the verification control device invalidates, provided that the electronic signature passes the verification, the public key which is set as the temporarily invalid key by the temporarily invalid setting device and moves the priorities of the rest of the public keys forward and performs control to store the public keys back in the public key storage device.

3. The information distribution system of claim 2, wherein:
the electronic signature generating device includes a center hash value generating device that generates a hash value of the map information;
the electronic signature generating device generates the electronic signature by using both of the hash value and the secret key whose priority is stored as being top in the secret key storage device; and
the verification control device, comprises:
a decode data generating device that generates decode data which is made by decoding the electronic signature by using the public key stored in the public key storage device; and
a navigation hash value generating device that generates the hash value of the map information; and
the verification control device allows the electronic signature to pass the verification when the decode data coincides with the hash value and does not allow the electronic signature to pass the verification when the decode data does not coincide with the hash value.

4. The information distribution system of claim 2, wherein:
the verification control device performs control to unset the setting of the public key as one temporarily invalid key by the temporarily invalid setting device, provided that the electronic signature does not pass the verification; and
the determining device determines that the map information is invalid information.

5. The information distribution system of claim 4, wherein:
the electronic signature generating device includes a center hash value generating device that generates a hash value of the map information;
the electronic signature generating device generates the electronic signature by using both of the hash value and the secret key whose priority is stored as being top in the secret key storage device; and
the verification control device, comprises:
a decode data generating device that generates decode data which is made by decoding the electronic signature by using the public key stored in the public key storage device; and
a navigation hash value generating device that generates the hash value of the map information; and
the verification control device allows the electronic signature to pass the verification when the decode data coincides with the hash value and does not allow the electronic signature to pass the verification when the decode data does not coincide with the hash value.

6. The information distribution system of claim 1, wherein:
the electronic signature generating device includes a center hash value generating device that generates a hash value of the map information;
the electronic signature generating device generates the electronic signature by using both of the hash value and the secret key whose priority is stored as being top in the secret key storage device; and
the verification control device, comprises:
a decode data generating device that generates decode data which is made by decoding the electronic signature by using the public key stored in the public key storage device; and
a navigation hash value generating device that generates the hash value of the map information; and
the verification control device allows the electronic signature to pass the verification when the decode data coincides with the hash value and does not allow the electronic signature to pass the verification when the decode data does not coincide with the hash value.

7. The information distribution system of claim 1, wherein:
the electronic signature generating device includes a center hash value generating device that generates a hash value of the map information;
the electronic signature generating device generates the electronic signature by using both of the hash value and the secret key whose priority is stored as being top in the secret key storage device; and
the verification control device, comprises:
a decode data generating device that generates decode data which is made by decoding the electronic signature by using the public key stored in the public key storage device; and
a navigation hash value generating device that generates the hash value of the map information; and
the verification control device allows the electronic signature to pass the verification when the decode data coincides with the hash value and does not allow the electronic signature to pass the verification when the decode data does not coincide with the hash value.

8. An information distribution method for distributing map information from an information distribution center to a navigation apparatus, comprising:
a step performed by the information distribution center of generating a plurality of sets of one public key and one secret key and setting priorities for the plurality of sets of one public key and one secret key;
a step performed by the information distribution center of storing the plurality of secret keys for which the priorities are set in the step of generating keys;
a step performed by the navigation apparatus of storing the plurality of public keys for which the priorities are set and which are issued by the information distribution center in the step of issuing the plurality of keys;
a step performed by the information distribution center of generating an electronic signature by using the secret key whose priority is top stored in the step of storing the plurality of secret keys;
a step performed by the information distribution center of distributing the electronic signature generated in the step of generating the electronic signature with the map information to the navigation apparatus;
a step performed by the navigation apparatus of extracting the electronic signature with the map information which is distributed from the information distribution center in the step of distributing the electronic signature;
a step performed by the navigation apparatus of performing control to verify the electronic signature which is extracted in the step of extracting the electronic signature by using the plurality of public keys stored in the step of storing public keys in order of the priorities;
a step performed by the navigation device of performing control to, provided that there is a public key which does not pass the verification before the electronic signature passes the verification, set the public key which does not pass the verification as invalid:
a step performed by the navigation apparatus of determining that the map information is valid information which is distributed from the information distribution center, provided that the electronic signature passes verification in the step of performing control to verify the electronic signature;
a step performed by the information distribution center of accepting an input of a secret key change request for a secret key whose priority is top: and a step performed by the information distribution center of determining whether the secret key change request for a secret key whose priority is top has been input on the input device, wherein if the determining step performed by the information distribution center determines that the secret key chance request for the secret key whose priority is top has been input, the secret key whose priority is top is invalidated.

* * * * *